United States Patent
Kim

(10) Patent No.: US 9,885,879 B2
(45) Date of Patent: Feb. 6, 2018

(54) CAMERA MODULE

(71) Applicant: LG Innotek Co., Ltd., Seoul (KR)

(72) Inventor: Dong Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/982,853

(22) Filed: Dec. 29, 2015

(65) Prior Publication Data

US 2016/0187670 A1 Jun. 30, 2016

(30) Foreign Application Priority Data

| Dec. 29, 2014 | (KR) | 10-2014-0191941 |
| Dec. 30, 2014 | (KR) | 10-2014-0193194 |
| Dec. 30, 2014 | (KR) | 10-2014-0193195 |

(51) Int. Cl.
  *G02B 7/02* (2006.01)
  *G02B 27/64* (2006.01)
  *G02B 7/08* (2006.01)

(52) U.S. Cl.
  CPC ............. *G02B 27/646* (2013.01); *G02B 7/08* (2013.01); *G02B 7/023* (2013.01)

(58) Field of Classification Search
  CPC .......... G02B 7/023; G02B 7/028; G02B 7/04; G02B 7/09; G02B 7/10; G02B 7/102; G02B 7/105
  USPC ................................................. 359/822–824
  See application file for complete search history.

(56) References Cited

U.S. PATENT DOCUMENTS

| 7,583,309 | B2* | 9/2009 | Aizawa | H01L 27/14618 348/340 |
| 7,613,389 | B2* | 11/2009 | Suzuki | G02B 7/023 348/335 |
| 7,686,524 | B2* | 3/2010 | Takizawa | H04N 5/2253 348/340 |
| 8,092,102 | B2* | 1/2012 | Shangguan | G03B 17/02 257/433 |
| 8,553,343 | B2* | 10/2013 | Fujinaka | G02B 7/006 359/892 |
| 2005/0274883 | A1* | 12/2005 | Nagano | G02B 7/025 250/239 |
| 2007/0212058 | A1* | 9/2007 | Kawai | G03B 17/02 396/429 |
| 2011/0058077 | A1* | 3/2011 | Ono | H01L 27/14618 348/294 |
| 2012/0211852 | A1* | 8/2012 | Iwafuchi | H01L 27/14618 257/435 |

(Continued)

*Primary Examiner* — Thomas K Pham
*Assistant Examiner* — Nicholas R Pasko
(74) *Attorney, Agent, or Firm* — Saliwanchik, Lloyd & Eisenschenk

(57) ABSTRACT

A lens moving apparatus includes a base, a printed circuit board disposed over the base, and mounted on the base, a coil disposed over the printed circuit board, and a lens barrel, which contacts the base at a lower portion of an outer surface thereof, wherein the base, the printed circuit board and the coil include respective holes, wherein the lens moving apparatus includes a blocking member, which is provided along an internal surface of the hole in the base and which protrudes in a first direction so as to prevent the lower portion of the outer surface of the lens barrel from contacting internal surfaces of the holes in the printed circuit board and/or the coil.

20 Claims, 20 Drawing Sheets

(56) References Cited

U.S. PATENT DOCUMENTS

2014/0293063 A1* 10/2014 Lee ...................... H04N 5/2254
                                                    348/164
2015/0138424 A1*  5/2015 Dobashi ............... H04N 5/2257
                                                    348/340

* cited by examiner

[FIG. 1]
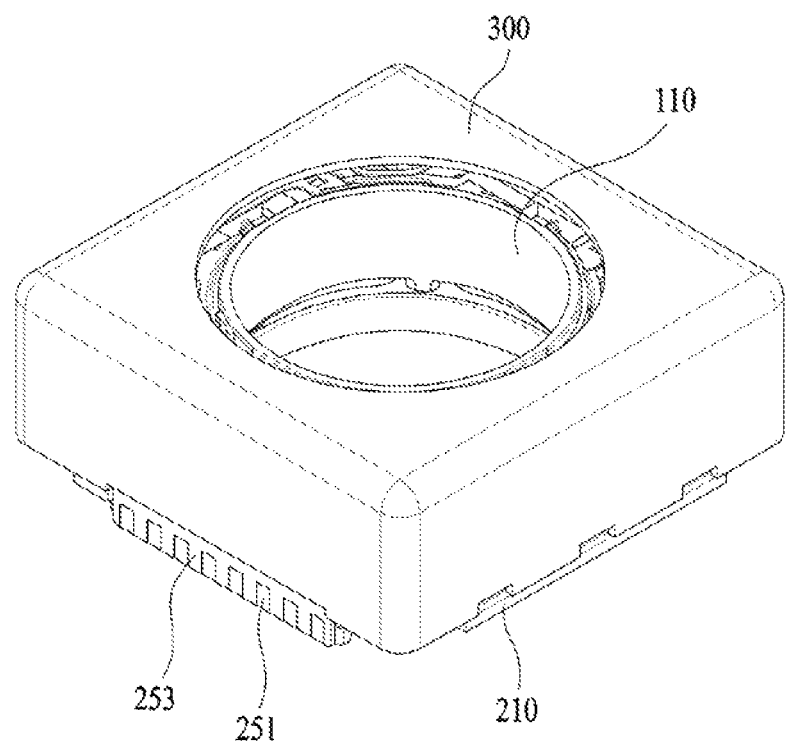

[FIG. 2]
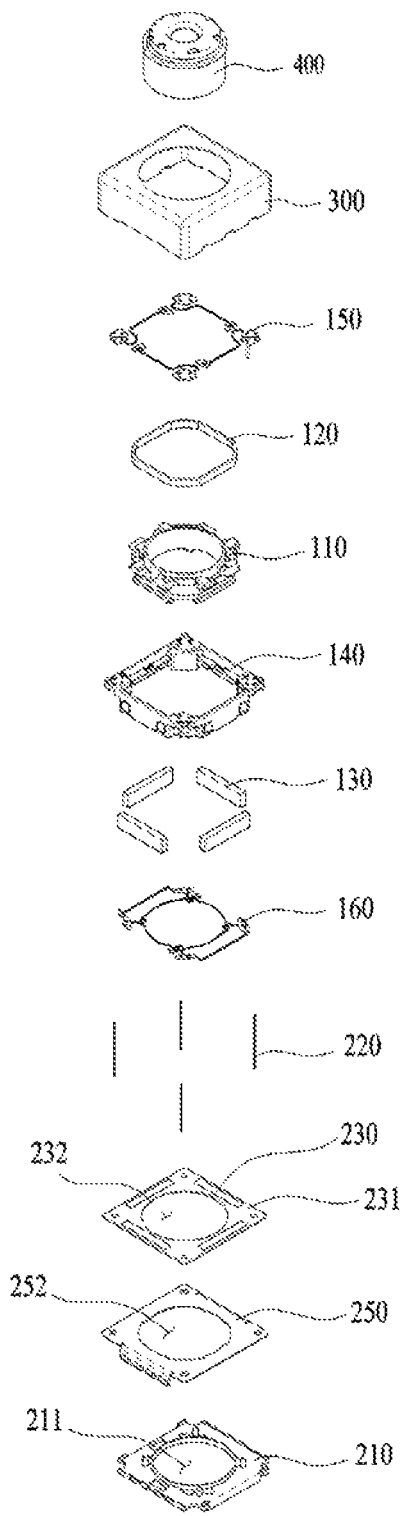

【FIG. 3】
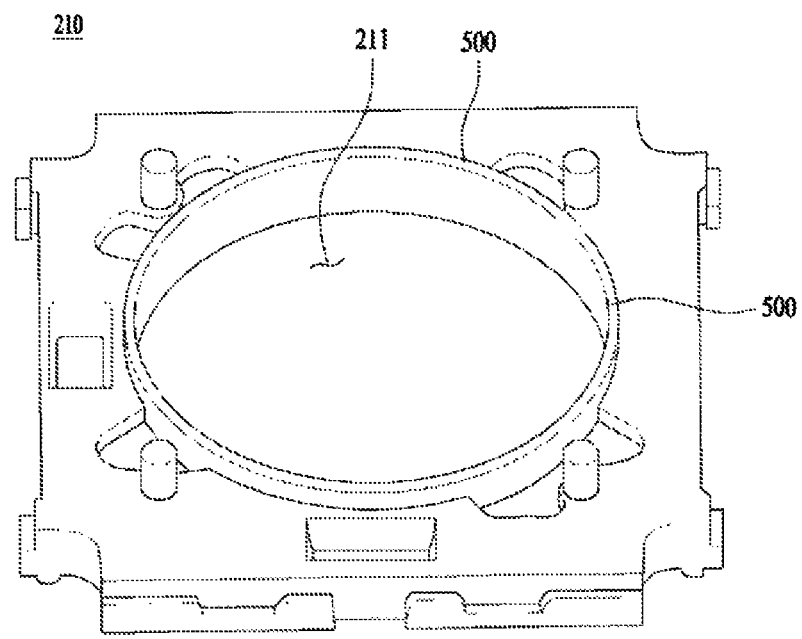
【FIG. 4】
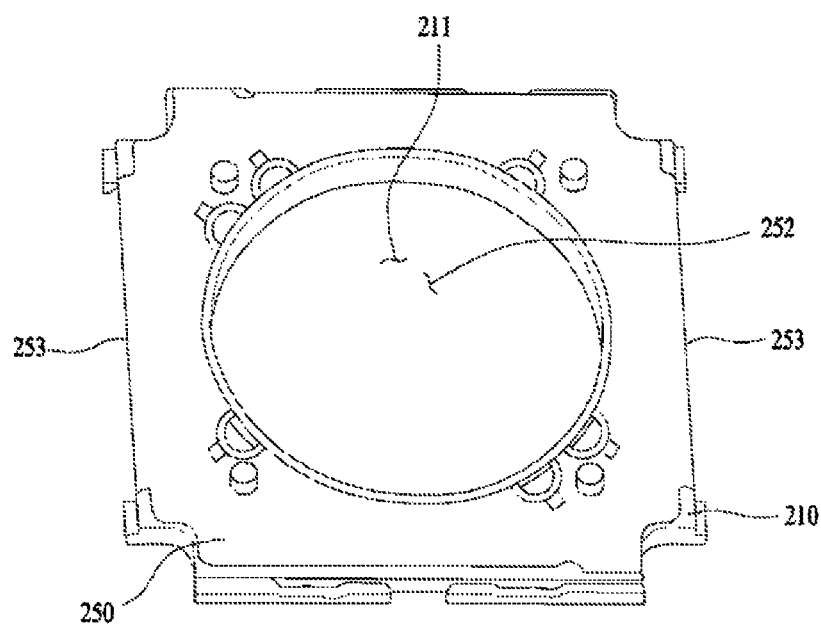

【FIG. 5】
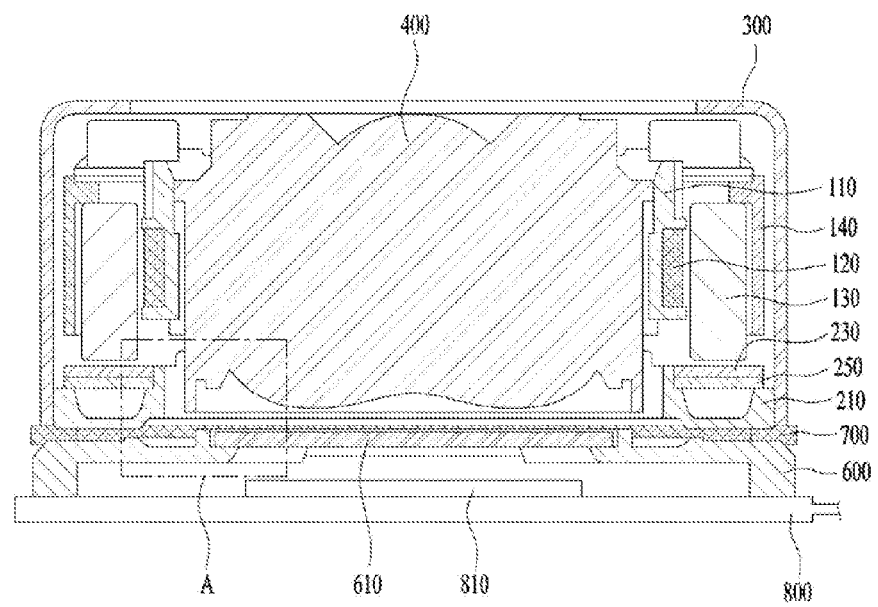

[FIG. 6]
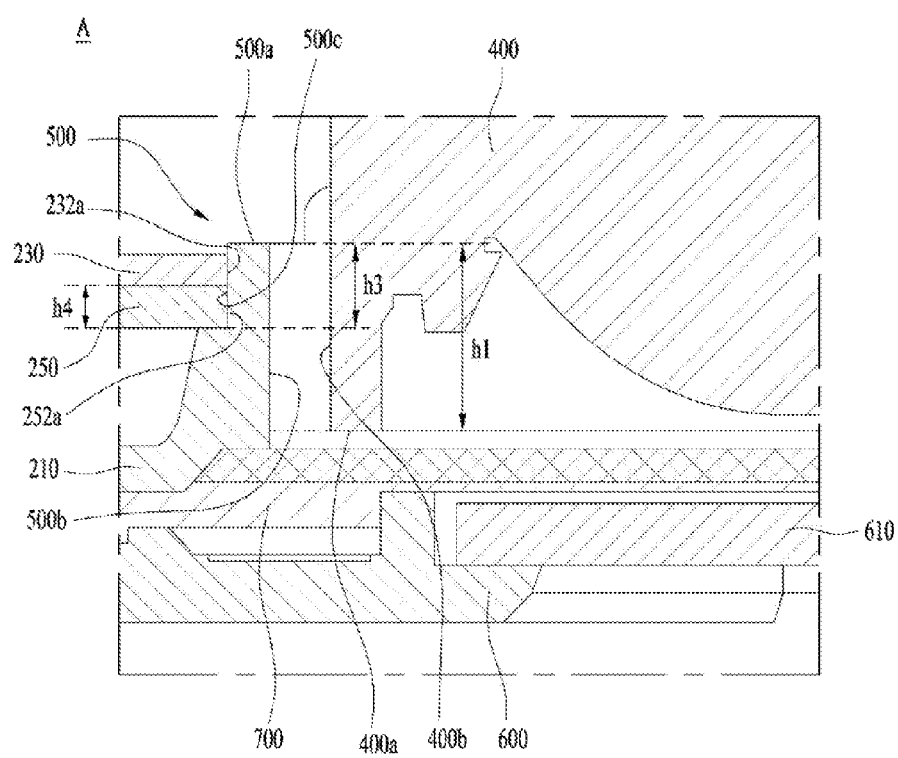

[FIG. 7]
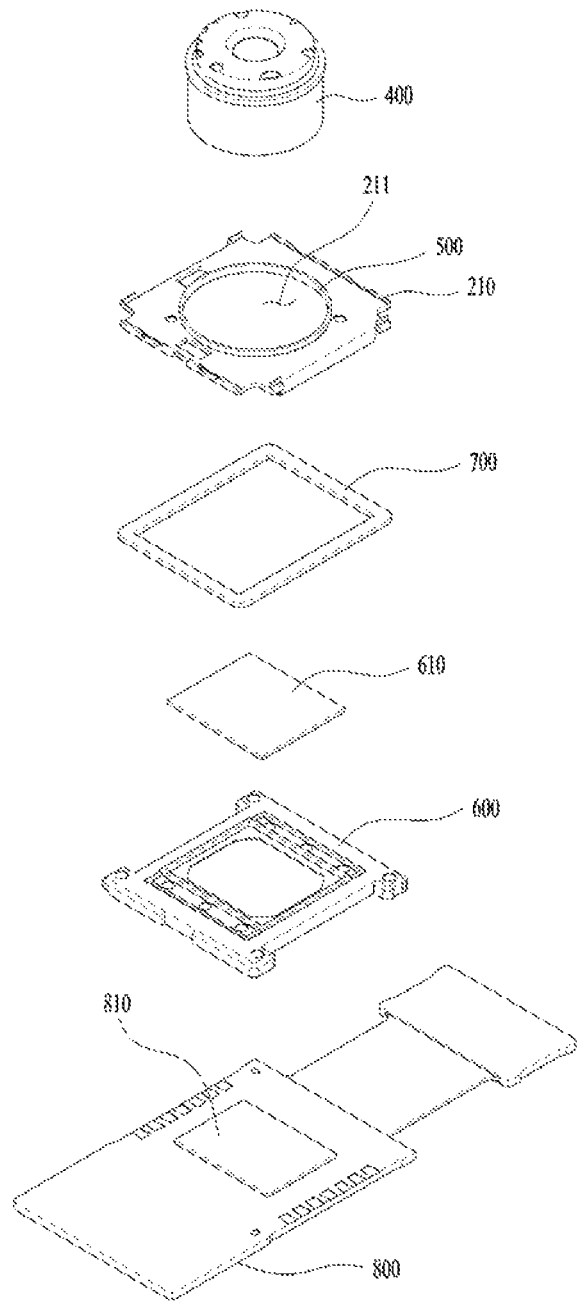

【FIG. 8】
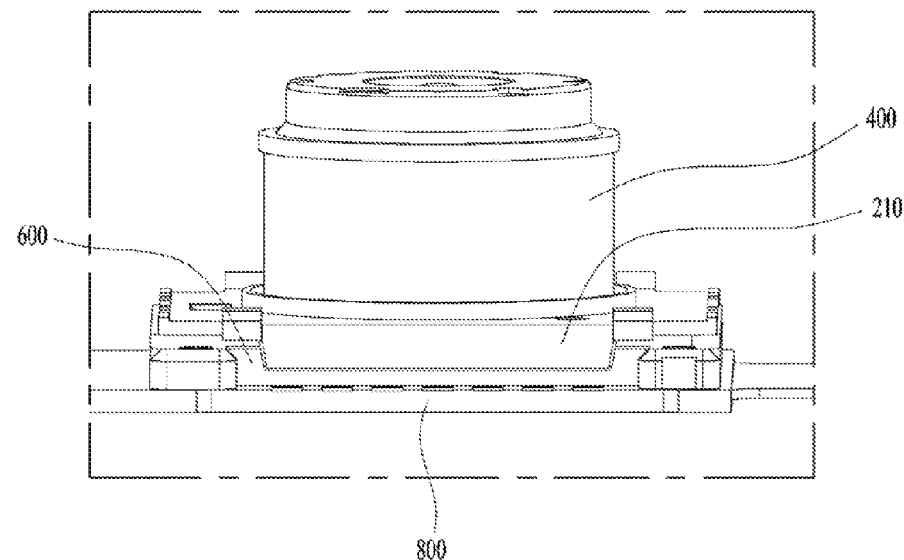
【FIG. 9】
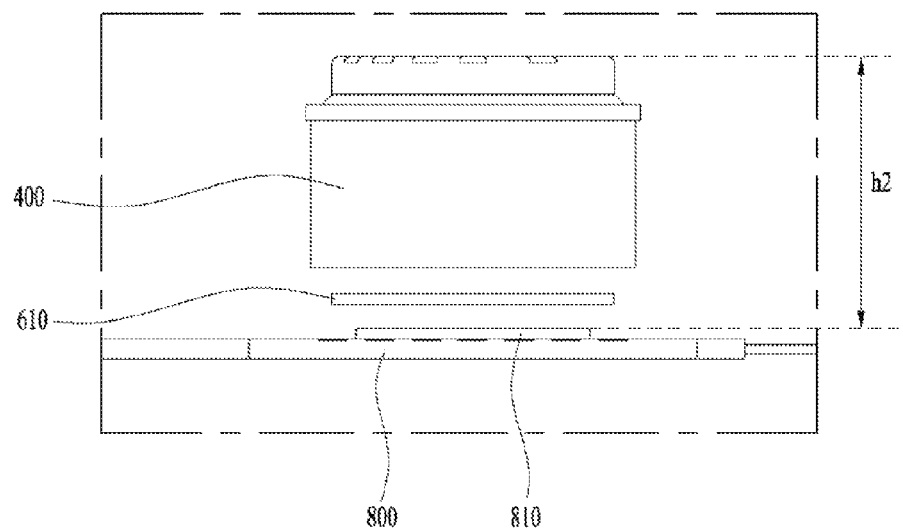

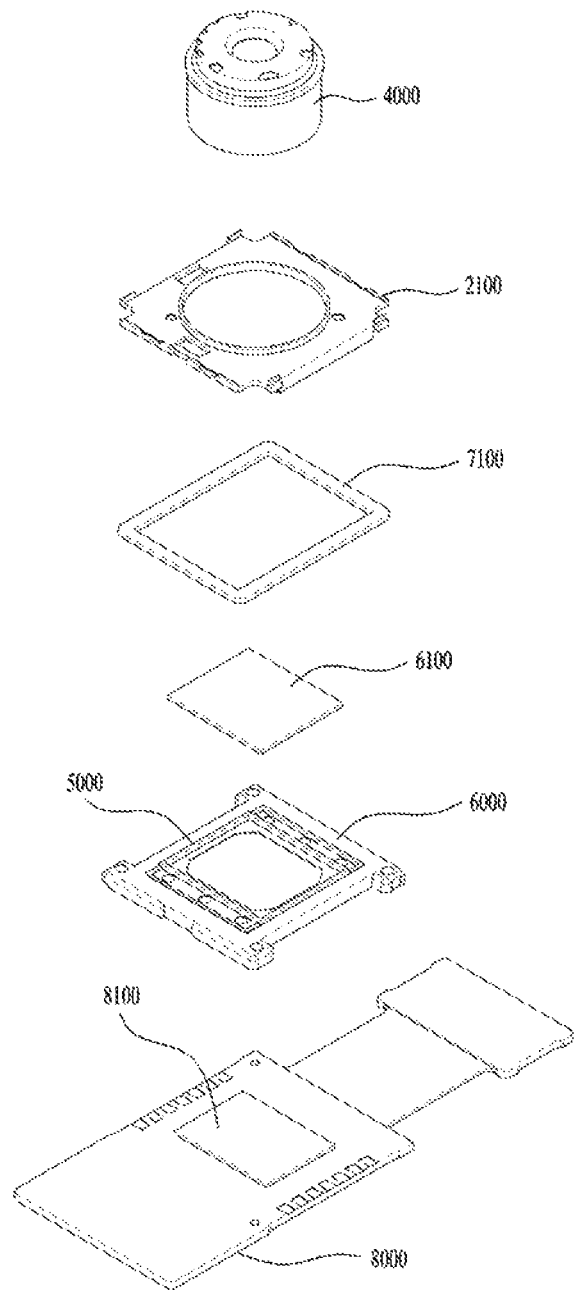
[FIG. 10A]

【FIG. 10B】
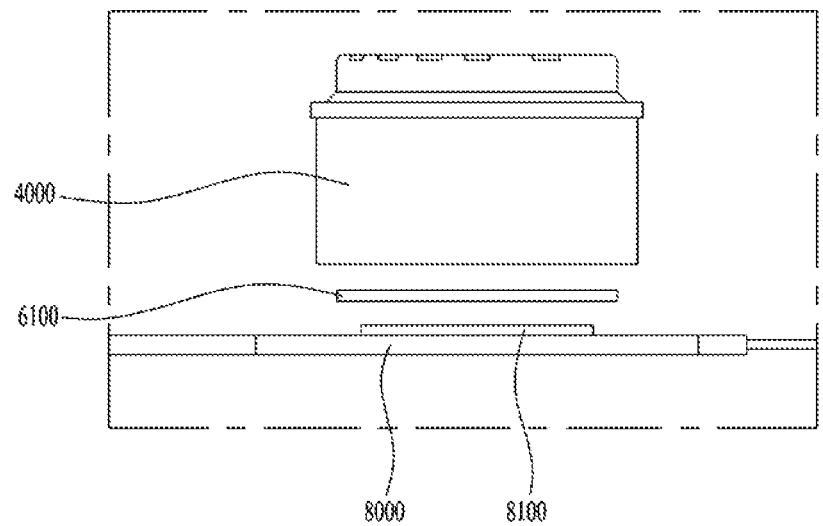
【FIG. 11】
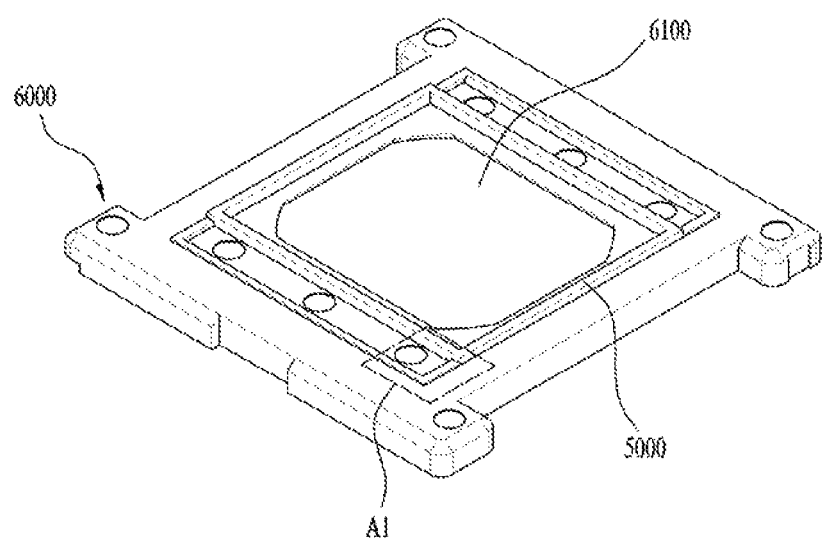

【FIG. 12】
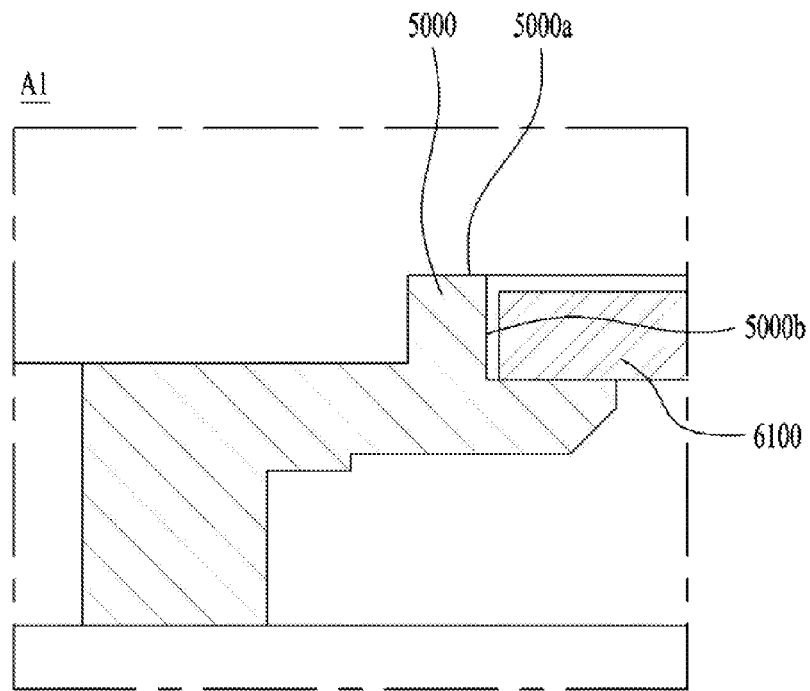
【FIG. 13】
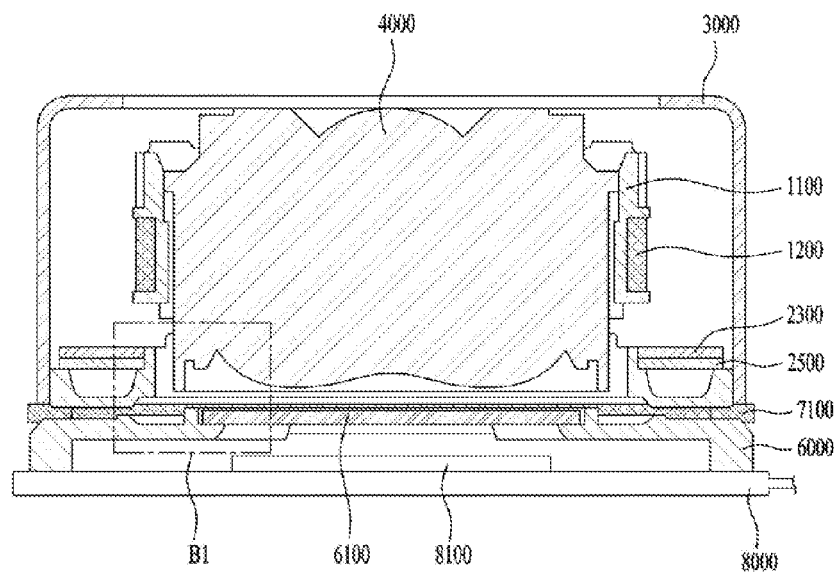

[FIG. 14]
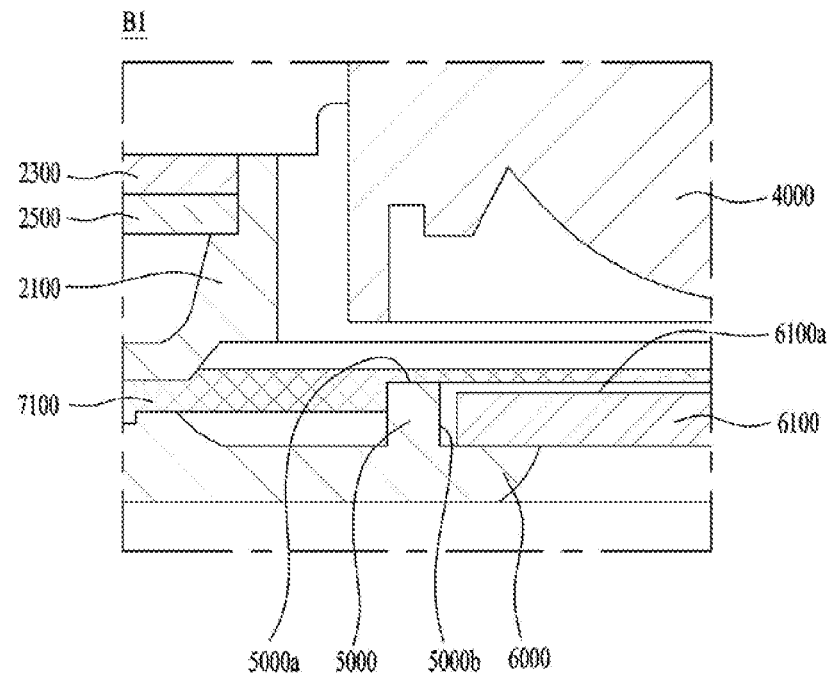
[FIG. 15]
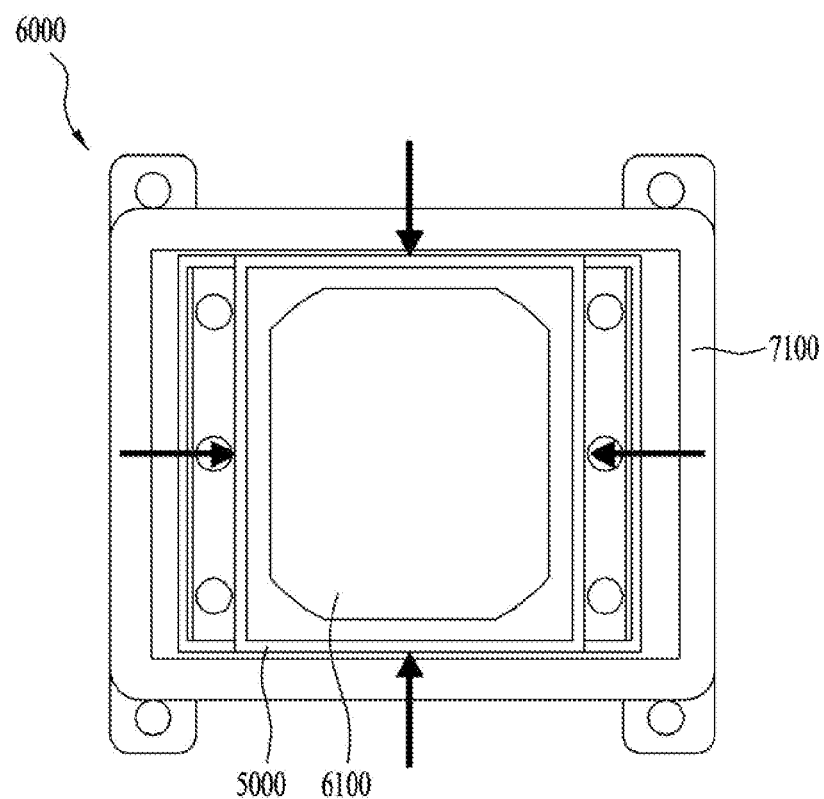

【FIG. 16】
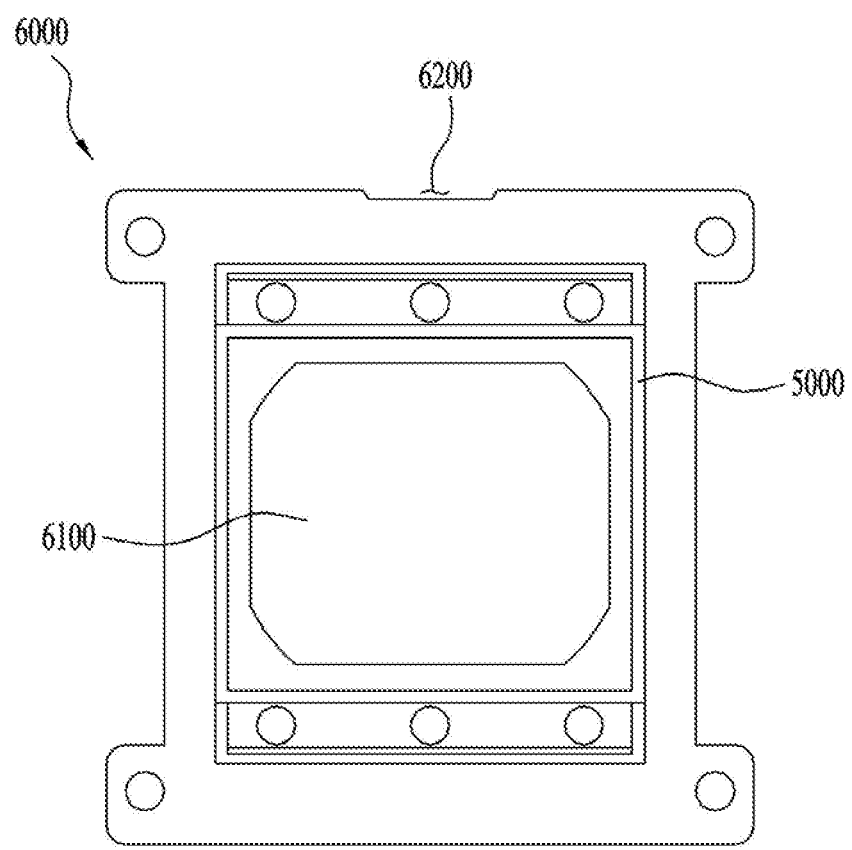

【FIG. 17】
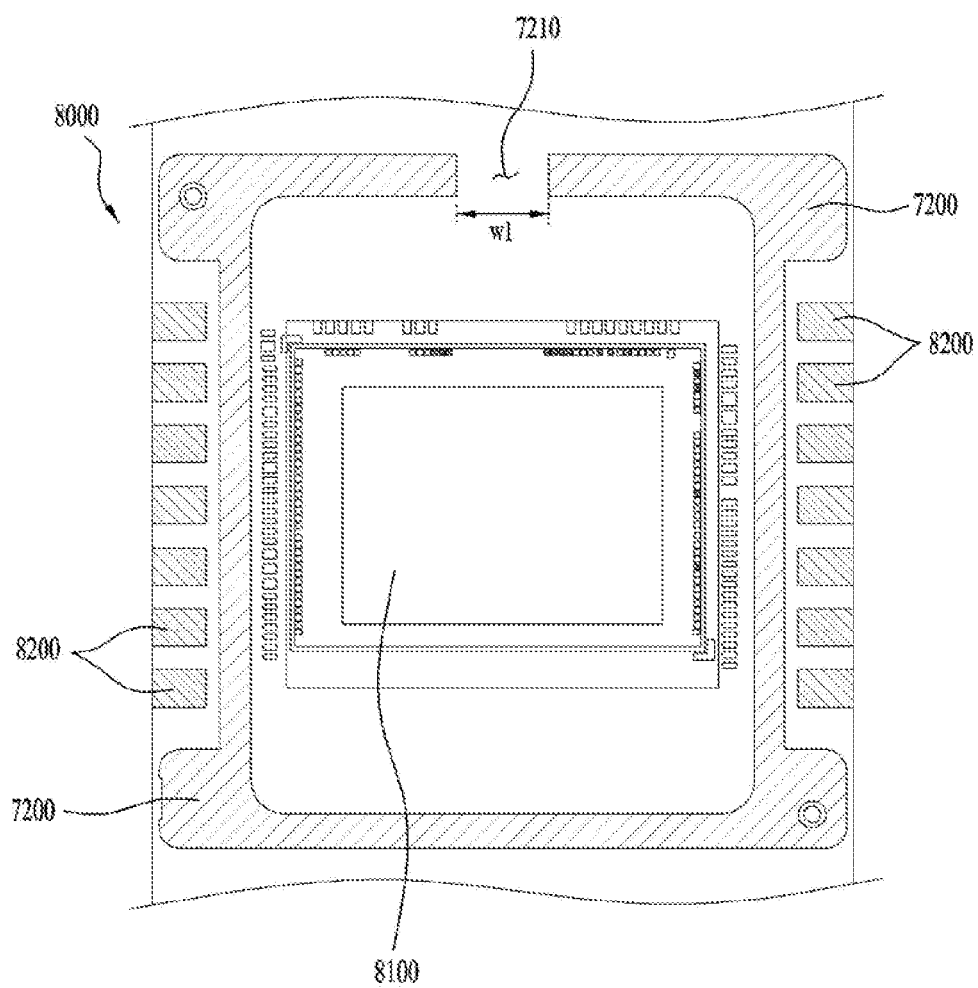

【FIG. 18】
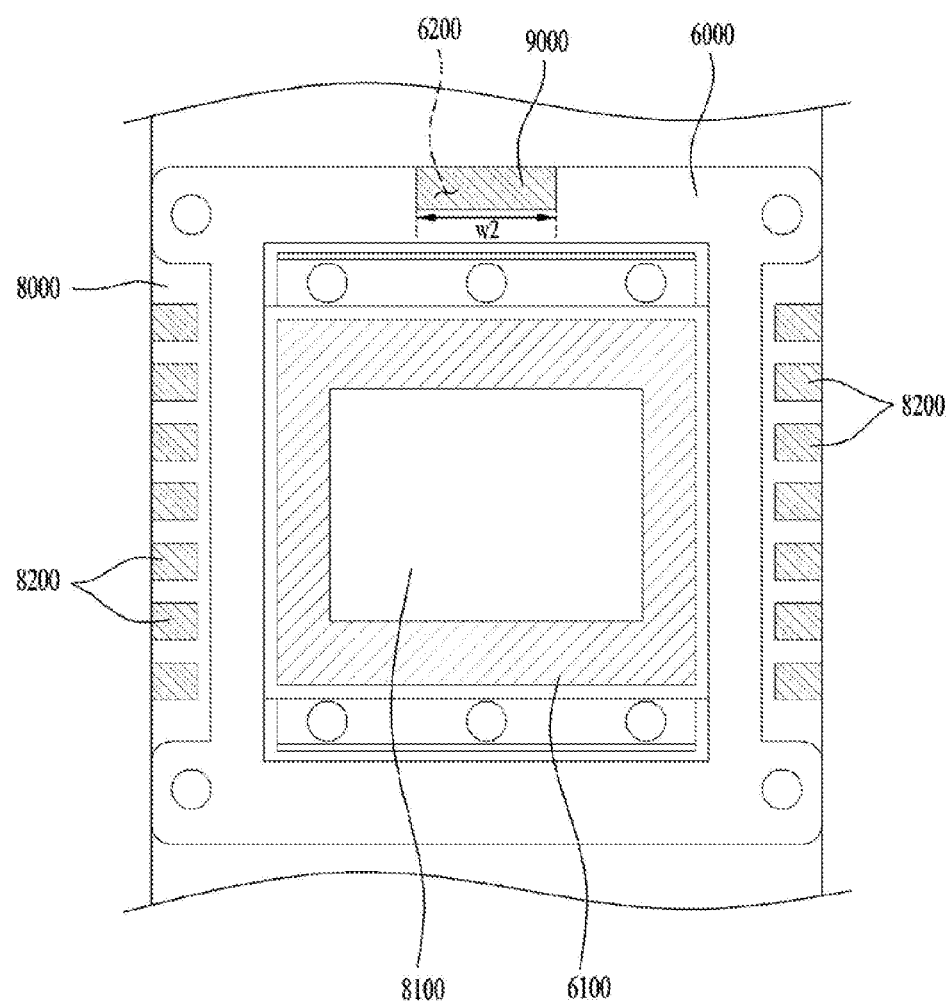

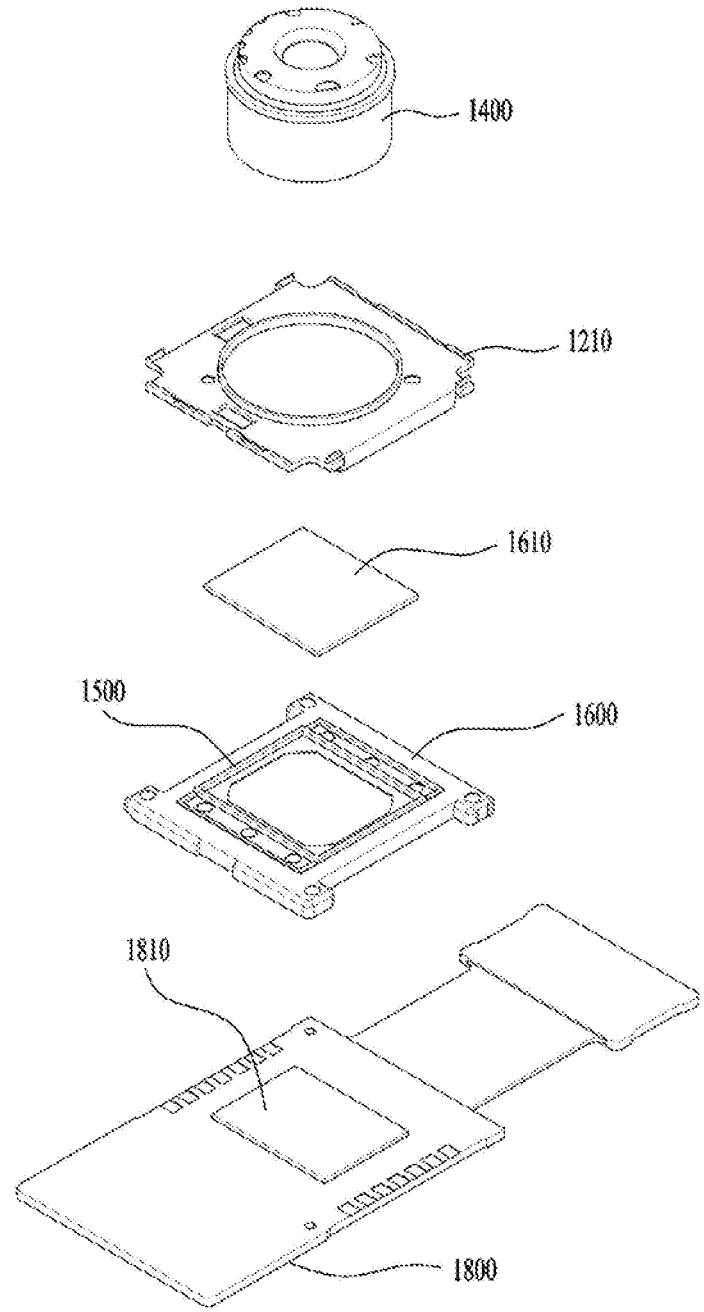
【FIG. 19】

【FIG. 20】
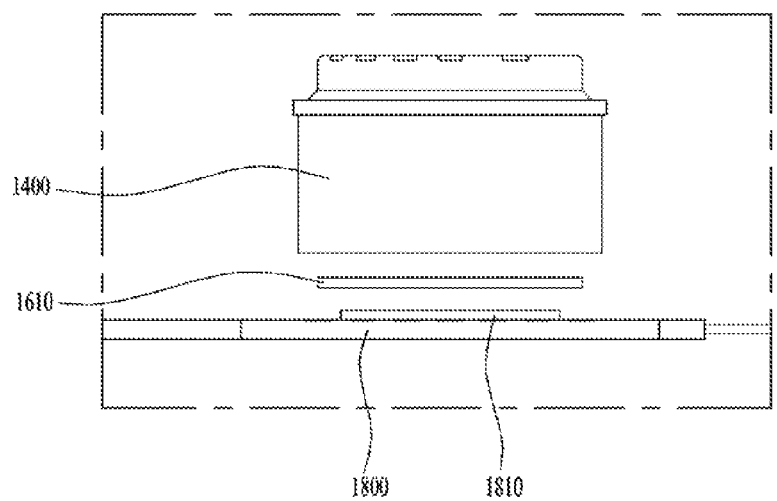
【FIG. 21】
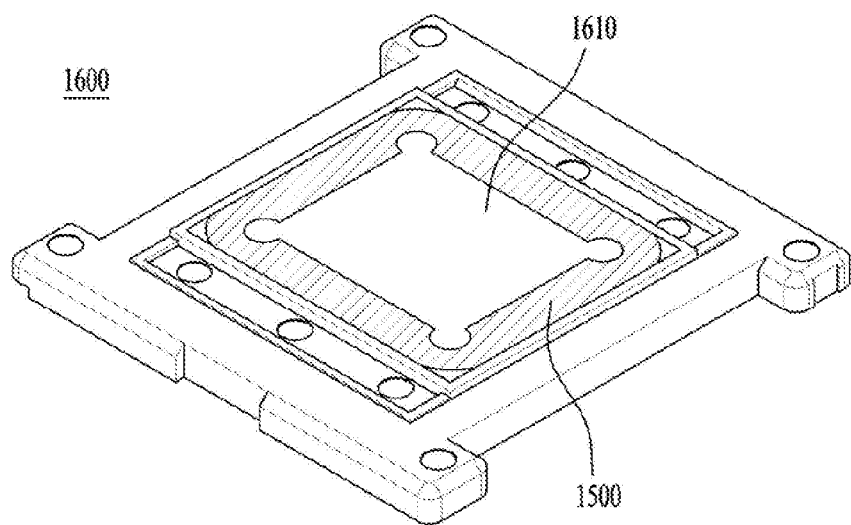

【FIG. 22】
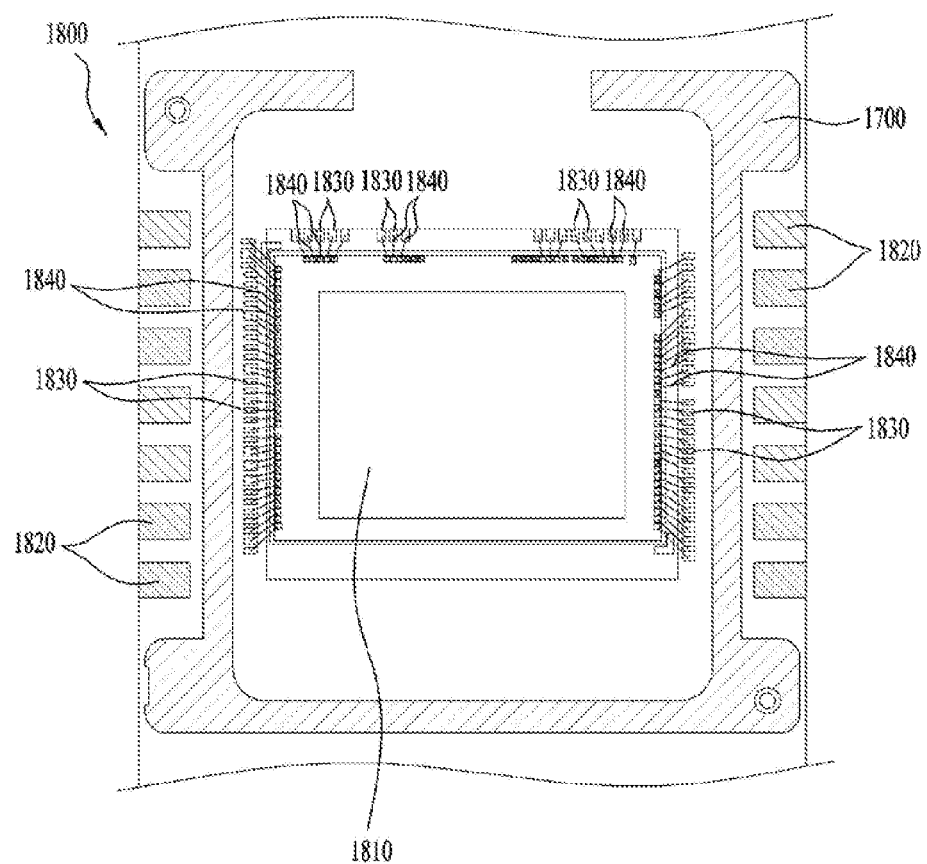

[FIG. 23]
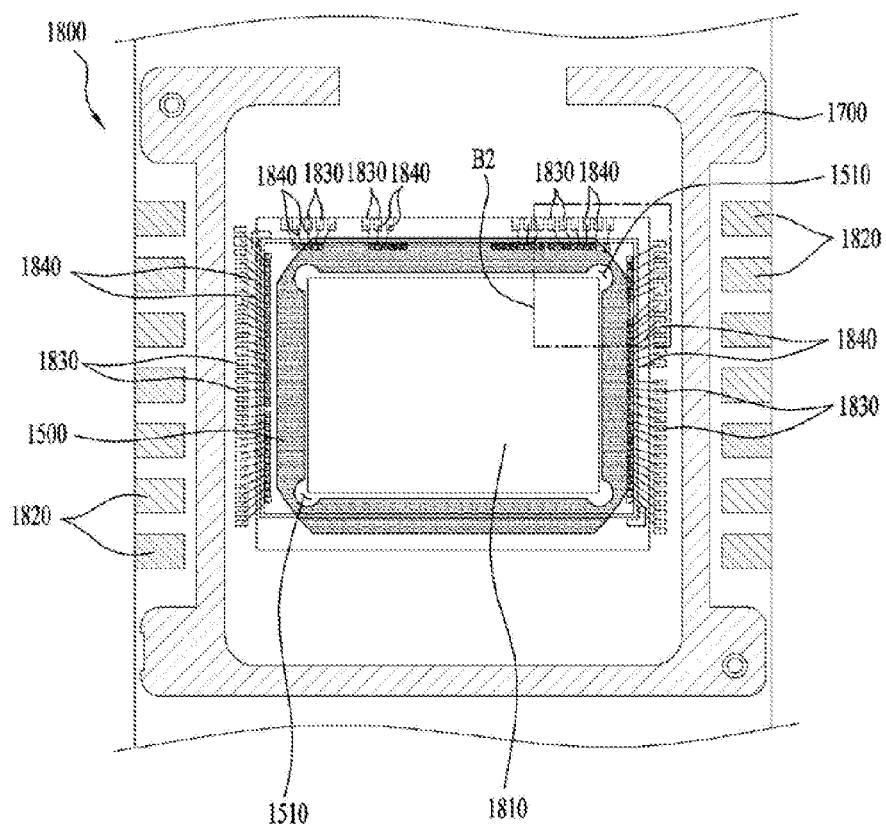

[FIG. 24]
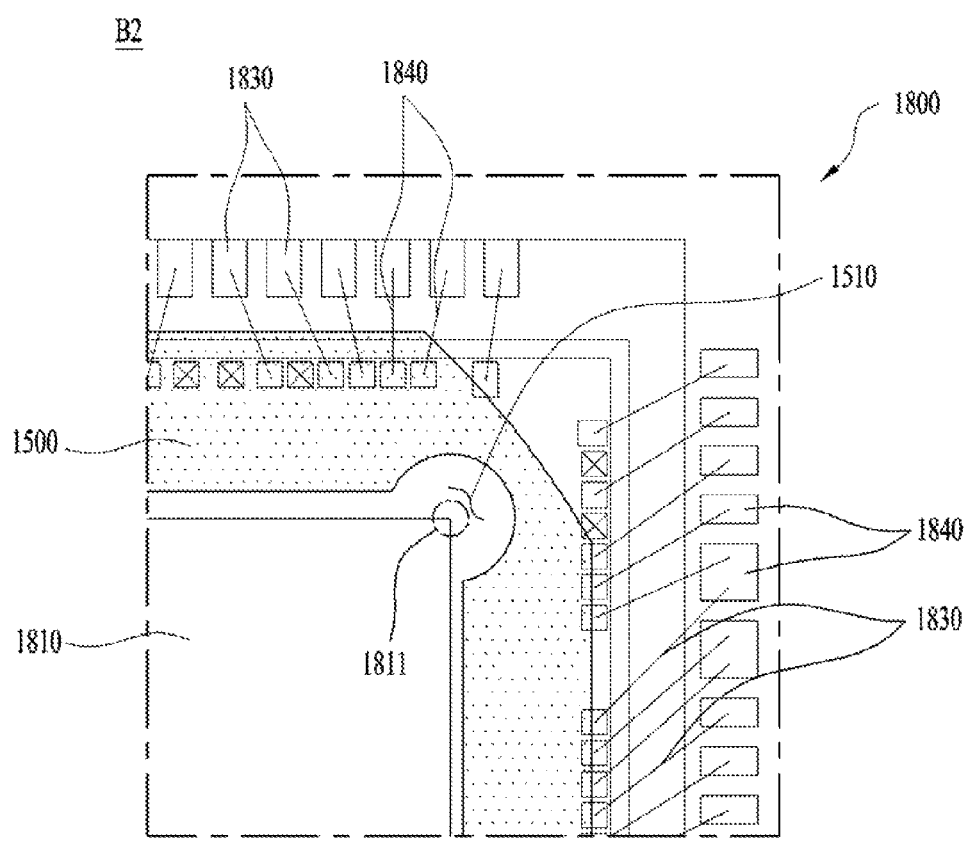

【FIG. 25】
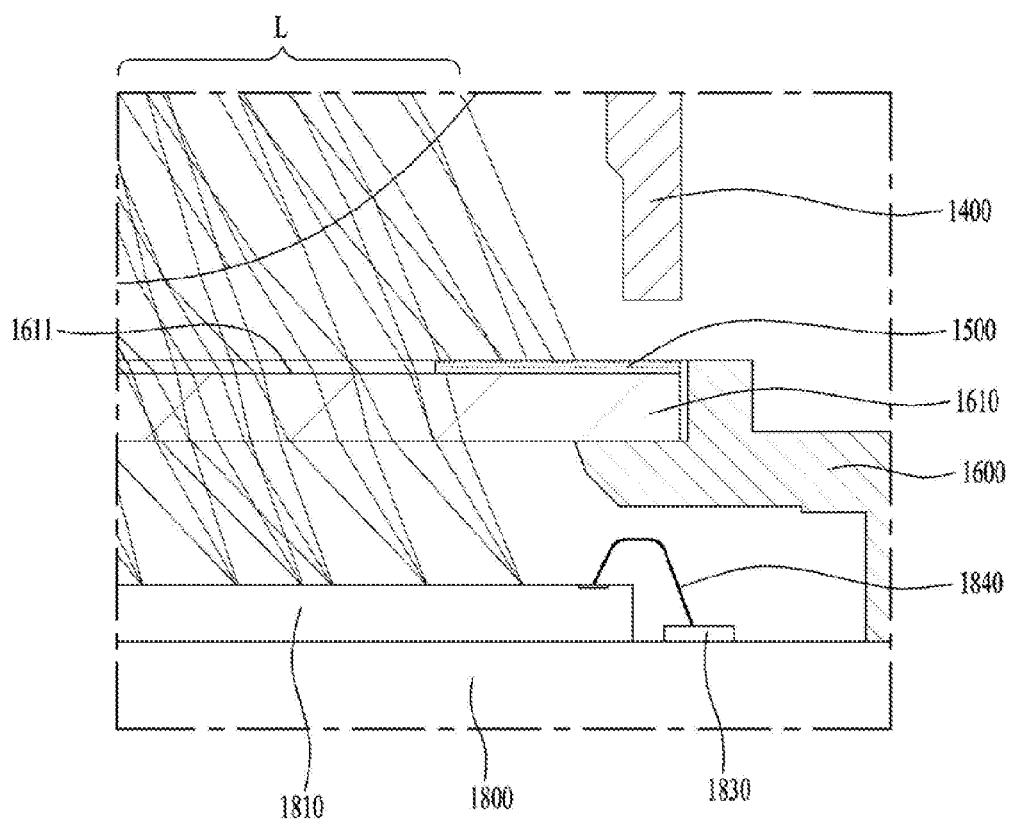

CAMERA MODULE

CROSS REFERENCE TO RELATED APPLICATIONS

This application claims the benefit under 35 U.S.C. §119 to Korean Patent Application No. 10-2014-0191941, filed on Dec. 29, 2014, Korean Patent Application No. 10-2014-0193194, filed on Dec. 30, 2014, and Korean Application No. 10-2014-0193195, filed on Dec. 30, 2014, which are hereby incorporated by reference in their entirety.

TECHNICAL FIELD

Embodiments relate to a camera module including a lens moving apparatus.

BACKGROUND

It is difficult to adopt voice coil motor (VCM) technology, which is typically used in conventional camera modules, for use in an ultracompact camera module, which aims at achieving low power consumption, and thus research into the technology has been actively undertaken.

A camera module mounted in a small-sized electronic product, such as a smart phone, may be frequently subjected to shocks during use. In addition, the camera module may minutely shake due to the trembling of the user's hand while taking a photograph. Therefore, there is a high necessity for a technology capable of incorporating an optical image stabilizer into the camera module.

A camera module may include a lens barrel equipped with at least one lens on which light is incident. The lens barrel may move in a plane perpendicular to the optical axis during handshake correction. During the movement of the lens barrel, the lens barrel may collide with components of a lens moving apparatus and a camera module including the lens moving apparatus. In this case, there is a problem in that the lens barrel and components colliding with the lens barrel may break.

A camera module may include a lens barrel equipped with at least one lens on which light is incident. When an autofocusing operation is performed or an external impact is applied to the camera module, the lens barrel may move upward and downward along the optical axis. During the movement of the lens barrel, the lens barrel may collide with the components of the lens moving apparatus and a camera module including the lens moving apparatus. In this case, there is a problem in that the lens barrel and components colliding with the lens barrel may break.

A camera module may include an image sensor, on which light containing an image of an object is incident and on which the image is formed. Components capable of reflecting incident lights may be disposed near the image sensor. Accordingly, when incident light is reflected by the components, there may be problems in that the image formed on the image sensor is distorted or the quality of the image is deteriorated.

BRIEF SUMMARY

Accordingly, an object of the embodiments is to provide a lens moving apparatus, which is capable of preventing the breakage caused by impacts attributable to the movement of a lens barrel in the direction perpendicular to the optical axis of the lens barrel during handshake correction.

Another object of the embodiments is to provide a lens moving apparatus, which is capable of preventing breakage caused by impacts attributable to the movement of a lens barrel in the optical axis direction when an autofocusing operation is performed or an external impact is applied.

A further object of the embodiments is to provide a lens moving apparatus, which is capable of preventing the distortion or quality deterioration of an image formed on an image sensor.

In one embodiment, a lens moving apparatus includes a base, a printed circuit board disposed over the base, and mounted on the base, a coil disposed over the printed circuit board, and a lens barrel, which contacts the base at a lower portion of an outer surface thereof, wherein the base, the printed circuit board and the coil include respective holes, wherein the lens moving apparatus includes a blocking member, which is provided along the internal surface of the hole in the base and which protrudes in a first direction so as to prevent the lower portion of the outer surface of the lens barrel from contacting the internal surfaces of the holes in the printed circuit board and/or the coil.

In another embodiment, a lens moving apparatus includes a first holder on which a filter is mounted, a lens barrel, which is movable upward and downward in a first direction, and a second holder, which is disposed under the first holder and on which an image sensor is mounted, wherein the first holder includes a protrusion, which is disposed along the side area of the filter and protrudes in the first direction.

In a further embodiment, a lens moving apparatus includes a first holder on which a filter is mounted, a lens barrel, which is movable upward and downward in a first direction, and a second holder, which is disposed under the first holder and on which an image sensor is mounted, wherein the filter includes a masking member, which is configured to have a rectangular shape when viewed in a first direction and which has a constant width along a side area thereof.

BRIEF DESCRIPTION OF THE DRAWINGS

Arrangements and embodiments may be described in detail with reference to the following drawings in which like reference numerals refer to like elements and wherein:

FIG. 1 is a perspective view showing part of a lens moving apparatus according to an embodiment of the present invention;

FIG. 2 is an exploded perspective view showing part of the lens moving apparatus according to the embodiment;

FIG. 3 is a perspective view showing the base according to an embodiment;

FIG. 4 is a perspective view showing the base and the printed circuit board, according to an embodiment, which are coupled to each other;

FIG. 5 is a cross-sectional view showing part of the lens moving according to an embodiment;

FIG. 6 is an enlarged cross-sectional view of region A of FIG. 5;

FIG. 7 is an exploded perspective showing part of the lens moving apparatus according to an embodiment;

FIG. 8 is a side view showing part of the lens moving apparatus according to the embodiment;

FIG. 9 is a side view showing the lens moving apparatus of FIG. 8, from which some components are removed;

FIG. 10A is an exploded perspective view showing part of the lens moving apparatus according to another embodiment;

FIG. 10B is a side view showing part of the lens moving apparatus according to the embodiment;

FIG. 11 is a perspective view showing the first holder according to an embodiment;

FIG. 12 is a cross-sectional view showing region A1 of FIG. 11;

FIG. 13 is a cross-sectional view showing part of the lens moving apparatus according to an embodiment;

FIG. 14 is a cross-sectional view showing region B1 of FIG. 13;

FIG. 15 is a plan view illustrating the function of the protrusion formed on the first holder according to an embodiment;

FIG. 16 is a plan view showing the first holder according to an embodiment;

FIG. 17 is a plan view showing the second holder according to an embodiment;

FIG. 18 is a plan view showing the first holder and the second holder, according to an embodiment, which are coupled to each other;

FIG. 19 is an exploded perspective view showing part of the lens moving apparatus according to a further embodiment;

FIG. 20 is a side view showing part of the lens moving apparatus according to the embodiment;

FIG. 21 is a perspective view showing the first holder according to the further embodiment;

FIG. 22 is a plan view showing the second holder according to the further embodiment;

FIG. 23 is a plan view showing the masking member, which overlaps the second holder shown in FIG. 22;

FIG. 24 is an enlarged view showing region B of FIG. 23; and

FIG. 25 is a cross-sectional view showing part of the lens moving apparatus according to an embodiment.

DETAILED DESCRIPTION

Hereinafter, embodiments will be described with reference to the attached drawings. In the drawings, the same or similar elements are denoted by the same reference numerals even when they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper proportion.

For reference, in the respective drawings, a rectangular coordinate system (x, y, z) may be used. In the drawings, the x-axis and the y-axis mean a plane perpendicular to an optical axis and, for convenience, an optical axis (z-axis) direction may be referred to as a first direction, an x-axis direction may be referred to as a second direction, and a y-axis direction may be referred to as a third direction.

FIG. 1 is a perspective view showing part of a lens moving apparatus according to an embodiment of the present invention. FIG. 2 is an exploded perspective view showing part of the lens moving apparatus according to the embodiment.

An optical image stabilizing apparatus, which is applied to compact camera modules of mobile devices such as smart phones or tablet PCs, refers to an apparatus configured to prevent the contour of an image, captured when taking a still image, from being unclearly formed due to vibrations caused by the trembling of the user's hand.

In addition, an autofocusing apparatus is configured to automatically focus the subject image on the surface of an image sensor. The optical image stabilizing apparatus and the autofocusing apparatus may be configured in various manners. In the embodiments, the lens moving apparatus may perform the optical image stabilizing and/or autofocusing operations in such a manner as to move an optical module, composed of a plurality of lenses, in a first direction or in a plane perpendicular to the first direction.

As shown in FIGS. 1 and 2, the lens moving apparatus according to an embodiment may include a movable unit. The movable unit may fulfill the functions of autofocusing and handshake correction for a lens. The movable unit may include a bobbin 110, a first coil 120, first magnets 130, a housing 140, an upper elastic member 150 and a lower elastic member 160.

The bobbin 110 may be accommodated in the housing 140. The first coil 120, which is disposed in the first magnets 130, may be provided on the outer surface of the bobbin 110. The bobbin 110 may be mounted so as to be reciprocated in a first direction in the internal space of the housing 140 by electromagnetic interaction between the first magnets 130 and the first coil 120. The first coil 120 may be provided on the outer surface of the bobbin 110 so as to electromagnetically interact with the first magnets 130.

The bobbin 110 may be moved in the first direction while being elastically supported by the upper and lower elastic members 150 and 160, thereby fulfilling the autofocusing function.

The bobbin 110 may include a lens barrel 400 into which at least one lens is mounted. The lens barrel 400 may be internally coupled to the bobbin 110 in various manners.

In an example, the bobbin 110 may be provided on the inner surface thereof with a female threaded portion, and the lens barrel 400 may be provided on the outer surface thereof with a male threaded portion corresponding to the female threaded portion, whereby the lens barrel 400 may be coupled to the bobbin 110 by means of threaded engagement therebetween. However, the coupling between the lens barrel and the bobbin 110 is not limited thereto, and the lens barrel may be directly coupled to the inside of the bobbin 110 in a way other than the threaded engagement, without providing the female threaded portion on the inner surface of the bobbin 110.

Alternatively, one or more lenses may be integrally formed with the bobbin 110 without using the lens barrel. However, in this embodiment, a lens moving apparatus, in which the lens barrel 400 is provided separately, is described.

The lens, which is coupled to the lens barrel 400, may be composed of a single lens, or two or more lenses constituting an optical system.

The autofocusing function may be controlled by changing the direction of current, or may be fulfilled by the action of moving the bobbin 110 in the first direction. For example, the bobbin 110 may be moved upward from its initial position upon the application of forward current, and may be moved downward upon the application of reverse current. The distance by which the bobbin 110 moves in one direction from the initial position may be increased or decreased by controlling the amount of current flowing in one direction.

The bobbin 110 may be provided on upper and lower surfaces thereof with a plurality of upper support protrusions and a plurality of lower support protrusions, respectively. The upper support protrusions may be configured to have a circular cylindrical shape or a rectangular column shape, and may serve to couple or secure the upper elastic member 150 thereto. The lower support protrusions may also be configured to have a circular cylindrical shape or a rectangular column shape, and may serve to couple or secure the lower elastic member 160 thereto, like the upper support protrusions.

The upper elastic member 150 may have through holes corresponding to the upper support protrusions, and the lower elastic member 160 may have through holes corresponding to the lower support protrusions. The respective support protrusions and the corresponding through holes may be fixedly coupled to each other by means of thermal fusion or an adhesive such as epoxy.

The housing 140 may be configured to have a hollow column, for example, an approximately rectangular hollow column capable of supporting the first magnets 130. Each lateral side of the housing 140 may be provided with the first magnet 130 and support members 220 secured thereto. As described above, the bobbin 110 may be disposed on the inner surface of the housing 140, and may be guided and moved in the first direction by the housing 140.

Each of the upper and lower elastic members 150 and 160 may be coupled to both the housing 140 and the bobbin 110, and the upper elastic member 150 and the lower elastic member 160 may elastically support the upward and/or downward movement of the bobbin 110 in the first direction. The upper elastic member 150 and the lower elastic member 160 may be constituted by a leaf spring.

As shown in FIG. 2, the upper elastic member 150 may be composed of a plurality of elastic members, which are separated from each other. By virtue of the multiple partitioning structure, current having different polarities or different electric powers may be applied to the respective elastic members of the upper elastic member 150. The lower elastic member 160 may also be composed of a plurality of elastic members, and may be conductively connected to the upper elastic member 150.

The upper elastic member 150, the lower elastic member 160, the bobbin 110 and the housing 140 may be assembled to one another by means of thermal fusion and/or bonding using an adhesive or the like.

The base 210 may be disposed under the bobbin 110, and may be configured to have an approximately rectangular shape. A printed circuit board 250 may be disposed over the base 210, and mounted on the base 210.

The regions of the base 210 that face terminal members 253 of the printed circuit board 250 may be provided with respective support recesses having a size corresponding to that of the terminal members 253. The support recesses may be recessed from the outer circumferential surfaces of the base 210 by a predetermined depth such that the terminal members 253 do not protrude outward from the outer circumferential surface of the base 210 or such that the extent to which the terminal members 253 protrude can be controlled.

The support members 220 are disposed on the lateral sides of the housing 140 such that the upper sides of the support members 220 are coupled to the housing 140 and the lower sides of the support members 220 are coupled to the base 210. The support members 220 may support the bobbin 110 and the housing 140 in such a manner as to allow the bobbin 110 and the housing 140 to move in the second and third directions, perpendicular to the first direction. The support members 220 may be conductively connected to the first coil 120.

Since the support members 220 according to the embodiment are disposed one on the outer surface of each corner of the housing 140, a total of four support members 220 may be disposed. The support members 220 may be conductively connected to the upper elastic member 150. Specifically, the support members 220 may be conductively connected to regions around the through holes.

Since the support members 220 are made of a material different from that of the upper elastic member 150, the support members 220 may be conductively connected to the upper elastic member 150 by means of a conductive adhesive, solder or the like. Consequently, the upper elastic member 150 may apply current to the first coil 120 through the support members 220 conductively connected thereto.

Although the support members 220 are illustrated in FIG. 2 as being embodied as linear support members according to an embodiment, the support members 220 are not limited thereto. In other words, the support members 220 may be configured to have a plate shape or the like.

Second coils 230 may move the housing 140 in the second and/or third directions to perform the handshake correction by virtue of electromagnetic interaction with the first magnets 130.

The second or third direction may include not only the x-axis direction or the y-axis direction but also a direction which is substantially close to the x-axis direction or the y-axis direction. In other words, in terms of driving in the embodiments, although a housing 140 may move in a direction parallel to the x-axis or the y-axis, the housing may move in a direction which is slightly inclined with respect to the x-axis or the y-axis in the state of being supported by a support member 220.

Accordingly, the first magnets 130 are required to be disposed at positions corresponding to the second coils 230.

The second coils 230 may be disposed so as to face the first magnets 130, which are secured to the housing 140. In one embodiment, the second coils 230 may be disposed outside the first magnets 130, or may be disposed under the first magnets 130 so as to be spaced apart from the first magnets 130 by a predetermined distance.

Although a total of four second coils 230 may be disposed one on each side of a circuit member 231 according to the embodiment, the disclosure is not limited thereto. Only two second coils 230, that is, one second coil for movement in the second direction and one second coil for movement in the third direction, may be provided, or a total of more than four second coils 230 may be provided.

In the embodiment, although circuit patterns having the shape of the second coils 230 are formed on the circuit member 231 and additional second coils are disposed on the circuit board 231, the disclosure is not limited thereto. Alternatively, only additional second coils 230 may be disposed on the circuit member 231, without forming the circuit patterns having the shape of the second coils 230.

Furthermore, the second coils 230, which have been prepared by winding wires into a doughnut shape or which have the shape of a finely patterned coil, may be conductively connected to the printed circuit board 250.

The circuit member 231 including the second coils 230 may be disposed on the upper surface of the printed circuit board 250, which is positioned over the base 210. However, the disclosure is not limited thereto, and the second coils 230 may be disposed on the base 210 in a state of being in close contact therewith, or may be spaced apart from the base 210 by a predetermined distance. In other examples, a substrate on which the second coils are formed may be layered on the printed circuit board 250 and connected thereto.

The printed circuit board 250 may be conductively connected to at least one of the upper elastic member 150 and the lower elastic member 160, and may be coupled to the upper surface of the base 210. As shown in FIG. 2, the printed circuit board 250 may have through holes formed at positions corresponding to the support members 220, so as to allow the support members 220 to be fitted into the through holes.

The printed circuit board 250 may be provided with the terminal members 253, which are formed by bending portions of the printed circuit board 250. Each terminal member 253 includes a plurality of terminals 251 for the application of external power to the terminal members 253, whereby current is supplied to the first coil 120 and the second coils 230. The number of terminals 251 provided on each terminal member 253 may be increased or decreased depending on the kinds of components to be controlled. Alternatively, the number of terminal members 253 provided on the printed circuit board may be one, or three or more.

A cover member 300, which is configured to have an approximate box shape, may accommodate the movable unit, the second coils 230 and a portion of the printed circuit board 250, and may be coupled to the base 210. The cover member 300 may serve to protect the movable unit, the second coils 230, the printed circuit board 250 and the like, accommodated therein, from damage, and may serve to prevent an electromagnetic field, which is generated by the first magnets 130, the first coil 120, the second coils 230 and the like, from leaking outward, thereby concentrating the electromagnetic field.

The base 210, the printed circuit board 250 and the circuit member 231 including the second coils 230 may be respectively provided with holes 211, 252, 232. By virtue of the respective holes 211, 252 and 232, the lens barrel 400 may be disposed to face a filter 610 or an image sensor 810, which will be described later, and light, which has passed through the lens barrel 400, may pass through the filter 610, and may then form an image on the image sensor 810.

In addition, the lower end of the lens barrel 400 may be disposed on the lens moving apparatus through the respective holes 211, 252 and 232.

FIG. 3 is a perspective view showing the base 210 according to an embodiment. FIG. 4 is a perspective view showing the base 210 and the printed circuit board 250, according to an embodiment, which are coupled to each other.

As shown in FIG. 3, the base 210 may include a blocking member 500. The blocking member 500 may serve to prevent contact between the internal surface of the hole in the printed circuit board 250 and/or the second coils 230 and the lower end of the side surface of the lens barrel 400.

As shown in FIG. 3, in an embodiment, the blocking member 500 may be configured to project in the first direction from the circumferential edge of the internal surface of the hole 211 in the base 210. The blocking member 500 may be formed along the internal surface of the hole 211 in the base 210 so as to exhibit an annular shape when viewed in the first direction.

However, the disclosure is not limited thereto. Although not shown in the drawings, in another embodiment, the blocking member 500 may include a plurality of blocking members, which are formed around the internal surface of the hole 211 in the base 210 so as to exhibit an annular shape when viewed in the first direction.

As shown in FIG. 4, when the printed circuit board 250 is disposed on the base 210, the blocking member 500 may extend through the hole 252 in the printed circuit board 250 such that the printed circuit board 250 is disposed over the base 210, and mounted on the base 210.

Although not shown in the drawings, when the second coils 230 are disposed on the printed circuit board 250, the blocking member 500 may be fitted into the hole 232 in the second coils 230 such that the second coils 230 are mounted on the printed circuit board 250.

FIG. 5 is a cross-sectional view showing part of the lens moving according to an embodiment. FIG. 6 is an enlarged cross-sectional view of region A of FIG. 5.

As shown in FIGS. 5 and 6, the lower end of the lens barrel 400 may extend downward. Specifically, this is because this configuration is essential in order to reduce the overall height, that is, the length in the first direction of the movable unit, in response to the recent trend toward small size and to reduce the overall height, that is, the length in the first direction, of the camera module for the purpose of fabrication of a high-resolution camera module.

In order to manufacture the camera moving apparatus and the camera module including the same, there is the need to provide the blocking member 500 for preventing the lower end of the lens barrel 400 from colliding with the second coils 230 or the printed circuit board 250 and to provide the blocking member 500 with specific features.

As shown in FIG. 6, the upper end 500a of the blocking member 500 may be positioned higher than the lower end 400a of the lens barrel 400 in the first direction. Due to this configuration, the outer surface 400b of the lens barrel 400 is positioned to face the inner surface 500b of the blocking member 500 at a lower part thereof.

Accordingly, during implementation of the handshake correction by the lens moving apparatus, even when the lens barrel 400 moves in the second or third direction perpendicular to the first direction, the lens barrel 400 may directly contact the blocking member 500 but cannot directly contact the internal surface 232a of the hole 232 in the second coils 230 or the internal surface 252a of the hole 252 in the printed circuit board 250, which is positioned outside the outer surface 550c of the blocking member 500 in the second or third direction.

In this way, the blocking member 550 may serve to prevent the lens barrel 400 from directly contacting the second coils 230 or the printed circuit board 250 when the lens barrel 400 moves in the second or third direction.

When the lens barrel 400 moves in the second or third direction and directly collides with the second coils 230 or the printed circuit board 250, partial breakage or abrasion of the lens barrel 400, the second coils 230 and the printed circuit board 250 may occur due to impacts with the second coils 230 or the printed circuit board 250.

Furthermore, when the second coils 230 or the printed circuit board 250 are configured to have a very small thickness in the first direction, sever breakage or abrasion may occur because the impacts may be locally concentrated on the second coils 230, the printed circuit board 250 and the lens barrel 400.

Consequently, the blocking member 500 may serve to prevent the second coils 230 or the printed circuit board 250 from directly contacting and colliding with the lens barrel 400. As a result, the blocking member 500 has the effect of preventing breakage or abrasion of the second coils 230, the printed circuit board 250 and the lens barrel 400 due to impact.

The blocking member 500 may be configured such that the inner surface 500b of the blocking member 500 at least partially overlaps the outer surface 400b of the lens barrel 400 in the second or third direction, perpendicular to the first direction.

Since the contact area between the inner surface 500*b* of the blocking member 500 and the outer surface 400*b* of the lens barrel 400 is increased as the length of the overlapping region h1 in the first direction is increased, it may be advantageous in the prevention of breakage or abrasion of the lens barrel 400.

Since there is a limit to increasing the overlapping region h1 in the case of a lens moving apparatus having a small size, it is necessary to appropriately set the length of the overlapping region h1 in consideration of the height h2 of the lens barrel 400, the size of the lens moving apparatus or other design conditions.

For example, when the height h2 of the lens barrel 400 in the first direction is within a range of 4 mm to 6 mm, the overlapping region h1 in the first direction may be within a range of 0.3 mm to 0.8 mm. Here, the height h2 of the lens barrel 400 may be the length measured from the upper surface of the image sensor 810 to the top of the lens barrel 400 in the first direction, as shown in FIG. 9.

The height h3 of the outer surface 500*c* of the blocking member 500 may be set to be larger than the thickness h4 of the printed circuit board 250 in the first direction.

As shown in FIG. 6, the second coils 230 may be mounted on a region of the blocking member 550 that corresponds to the difference between the height h3 of the outer surface 500*c* of the blocking member 500 and the thickness h4 of the printed circuit board 250, and may then be coupled to the printed circuit board 250.

Accordingly, when the height h3 of the outer surface 500*c* of the blocking member 500 is larger than the thickness h4 of the printed circuit board 250, it is possible to prevent direct contact between the internal surface 232*a* of the hole 232 of the second coils 230 and the outer surface 400*b* of the lens barrel 400 by virtue of the blocking member 500.

As described above, the outer surface 500*c* of the blocking member 500 may be configured to have a height corresponding to at least a portion of the internal surface 252*a* of the hole 252 in the printed circuit board 250 and the internal surface 232*a* of the hole 232 in the second coil 230.

In other words, although the height h3 of the outer surface 500*c* of the blocking member 500 may be smaller than the total height of the printed circuit board 250 and the second coil 230, the height h3 of the outer surface 500*c* of the blocking member 500 is preferably larger than at least the thickness h4 of the printed circuit board 250.

If the height h3 of the outer surface 500*c* of the blocking member 500 is smaller than the thickness h4 of the printed circuit board 250, the entire internal surface 232*a* of the hole 232 in the second coil 230 directly faces the outer surface 400*b* of the lens barrel 400. As a result, the internal surface 232*a* of the hole 232 in the second coil 230 may directly contact or collide with the outer surface 400*b* of the lens barrel 400 without interception by the blocking member 500.

According to this embodiment, the height h3 of the outer surface 500*c* of the blocking member 500 is larger than the thickness h4 of the printed circuit board 250, and the region of the outer surface 500*c* of the blocking member 500, which corresponds to the difference between the height h3 of the outer surface 500*c* of the blocking member 500 and the thickness h4 of the printed circuit board 250, may contact the internal surface 232*a* of the hole 232 of the second coil 230.

Consequently, since direct contact between the second coils 230 and the lens barrel 400 is prevented by the blocking member 500, it is possible to prevent breakage of the second coils 230 or the lens barrel 400 due to direct contact or collision between the second coils 230 and the lens barrel 400.

FIG. 7 is an exploded perspective showing part of the lens moving apparatus according to an embodiment. FIG. 8 is a side view showing part of the lens moving apparatus according to the embodiment. FIG. 9 is a side view showing the lens moving apparatus of FIG. 8, from which some components are removed.

The lens moving apparatus according to the embodiment may further include a first holder 600 and a second holder 800. The first holder 600 may be disposed under the base 210, and may be provided with a filter 610 mounted thereon.

The filter 610 may serve to prevent light of a specific frequency range, among the light having passed through the lens barrel 400, from entering the image sensor 810. Here, the filter 610 is preferably placed in the x-y plane.

The filter 610 may be coupled to the upper surface of the first holder 600, and may be an infrared screening filter in an embodiment. The region of the first holder 600 on which the filter 610 is mounted may be provided with a hole so as to allow light having passed through the filter 610 to enter the image sensor 810.

The base 210 and the first holder 600 may be coupled to each other by means of an adhesive 700. Here, the adhesive 700 may include epoxy, thermosetting adhesive, ultraviolet-curable adhesive and the like.

The adhesive 700 shown in FIG. 7 may be applied to the attachment area of the base 210 or the first holder 600, and the base 210 and the first holder 600 may be coupled to each other. As a result, the base 210 may be secured to the first holder 600 as the adhesive 700 is cured.

The adhesive 700 may serve as a seal for blocking the infiltration of contaminants into the lens moving apparatus. Accordingly, when the base 210 is secured to the first holder 600 by means of the adhesive 700, there is a need for application of the adhesive 700 in order to ensure sufficient sealing of the attachment area.

The second holder 800 may be disposed under the first holder 600, and may be provided with the image sensor 810 mounted thereon. Light that has passed through the filter 610 is incident on the image sensor 810, thereby forming an image, which is contained in the light, on the image sensor 810.

The image sensor 810 is preferably placed on the x-y plane. In one embodiment, the image sensor 810 may be mounted on the upper surface of the first holder 600.

The second holder 800 may include various circuits, devices, controllers and the like for converting the image formed on the image sensor 810 into an electric signal and transmitting the signal to an external device.

The second holder 800 may be coupled to the first holder 600. As in the coupling between the base 210 and the first holder 600, the second holder 800 may be securely coupled to the first holder 600 through bonding using an adhesive material.

As shown in FIG. 9, the filter 610 and the image sensor 810 may be positioned to face each other in the first direction. Here, the filter 610 may be spaced apart from the image sensor 810 by a predetermined distance in the first direction.

As described above, the height h2 of the lens barrel 400, that is, the length, which is measured from the upper surface of the image sensor 810 to the top of the lens barrel 400 in the first direction, may be within a range of 4 mm to 6 mm.

In the embodiment, the blocking member 500 has the effect of preventing breakage or abrasion of the second coil 230, the printed circuit board 250 and the lens barrel 400 due to impacts. Accordingly, the embodiment is able to increase the durability of the second coil 230, the printed circuit board 250 and the lens barrel 400.

Furthermore, it is possible to prevent particles, generated by breakage and abrasion of the second coil 230, the printed circuit board 250 and the lens barrel 400, from contaminating or damaging the inside of the lens moving apparatus.

FIG. 10A is an exploded perspective view showing part of the lens moving apparatus according to another embodiment. FIG. 10B is a side view showing part of the lens moving apparatus according to the embodiment.

The lens moving apparatus according to the embodiment may further include a first holder 6000 and a second holder 8000. The first holder 6000 may be disposed under the base 2100, and may be provided with the filter 6100 mounted thereon. Here, the lens barrel 4000 may be mounted on the bobbin 1100 such that the lens barrel 4000 is movable upward and downward in the first direction with respect to the first holder 6000.

The filter 6100 may serve to prevent light of a specific frequency range, among lights having passed through the lens barrel 4000, from entering the image sensor 8100. Here, the filter 6100 is preferably placed in the x-y plane.

The filter 6100 may be coupled to the upper surface of the first holder 6000, and may be an infrared screening filter in an embodiment. The region of the first holder 6000, on which the filter 6100 is mounted, may be provided with a hole so as to allow light having passed through the filter 6100 to enter the image sensor 8100.

The base 2100 and the first holder 6000 may be coupled to each other by means of a first adhesive member 7100. Here, the adhesive constituting the first adhesive member 7100 may include epoxy, thermosetting adhesive, ultraviolet-curable adhesive and the like.

The first adhesive member 7100 shown in FIG. 10A may be applied to the attachment area of the base 2100 or the first holder 6000, and the base 2100 and the first holder 6000 may be coupled to each other. As a result, the base 2100 may be secured to the first holder 6000 as the adhesive 7100 is cured.

The first adhesive member 7100 may serve as a seal for blocking the infiltration of contaminants into the lens moving apparatus. Accordingly, when the base 2100 is secured to the first holder 6000 using a sufficient amount of adhesive, there is a need to maintain the attachment area in a sufficiently sealed state.

The second holder 8000 may be disposed under the first holder 6000, and may be provided with the image sensor 8100 mounted thereon. Light having passed through the filter 6100 is incident on the image sensor 8100, thereby forming an image, which is contained in the light, on the image sensor 8100.

The image sensor 8100 is preferably placed in the x-y plane. In one embodiment, the image sensor 8100 may be mounted on the upper surface of the first holder 6000.

The second holder 8000 may include various circuits, devices, controllers and the like for converting the image formed on the image sensor 8100 into an electric signal and transmitting the signal to an external device.

The second holder 8000 may be coupled to the first holder 6000. As in the coupling between the base 2100 and the first holder 6000, the second holder 8000 may be securely coupled to the first holder 6000 through bonding using an adhesive material. The second holder 8000 may be constituted by a circuit board, on which the image sensor 8100 is mounted and a circuit pattern is formed, and to which various devices are coupled.

As shown in FIG. 10B, the filter 6100 and the image sensor 8100 may be positioned to face each other in the first direction. Here, the filter 6100 may be spaced apart from the image sensor 8100 by a predetermined distance in the first direction.

FIG. 11 is a perspective view showing the first holder 6000 according to an embodiment. FIG. 12 is a cross-sectional view showing region A1 of FIG. 11. As shown in FIG. 11, the first holder 6000 may include a protrusion 5000.

The protrusion 5000 may serve to prevent the lower end of the lens barrel 4000 from contacting the filter 6100 at the area of the first holder 6000 on which the filter 6100 is mounted. The protrusion 5000 may protrude in the first direction along the peripheral edge of the filter 6100.

As shown in FIG. 12, the upper end 5000a of the protrusion 5000 may be positioned to be higher than the upper surface 6100a of the filter 6100 in the first direction. This intends to prevent the lower end of the lens barrel 4000 from directly colliding with the filter 6100 when the lens barrel 4000, mounted on the bobbin moves upward or downward, or moves downward in the first direction due to external impacts. The structure for preventing collision will be described in detail later with reference to FIG. 14.

The inner surface 5000b of the protrusion 5000 may be positioned to face the side surface of the filter 6100 in the state of being spaced apart therefrom. This intends to ensure a machining tolerance for allowing the filter 6100 to be easily mounted in the protrusion 5000 of the first holder 6000.

Furthermore, when the lens barrel 4000 or another component of the lens moving apparatus applies an impact to the protrusion 5000, this configuration prevents the impact from being directly transmitted to the filter 6100 through the protrusion 5000, thereby preventing breakage or damage to the filter 6100.

Referring again to FIG. 11, the filter 6100 may be configured to have a rectangular shape when viewed in the first direction. Since the filter 6100 made of a transparent material is attached to the peripheral area of the octagonal hole formed in the first holder 6000 by means of an adhesive or the like, a transparent octagonal area through which the light having passed through the lens barrel 4000 passes may be defined, as shown in FIG. 11.

In accordance with the configuration of the filter 6100, the protrusion 5000 may be constructed, for example, by disposing linear members having a constant width along the respective sides of the filter 6100 when viewed in the front direction and coupling the linear members to each other at the respective corners of the filter 6100.

The linear members may be integrally formed with the first holder 6000 through injection molding or the like such that the linear members protrude from the upper surface of the first holder 6000. Alternatively, the protrusion 5000 may be formed by coupling additional linear members to the upper surface of the first holder 6000 by means of an adhesive, thermal fusion or the like.

FIG. 13 is a cross-sectional view showing part of the lens moving apparatus according to an embodiment. FIG. 14 is a cross-sectional view showing region B1 of FIG. 13. FIG. 15 is a plan view illustrating the function of the protrusion 5000 formed on the first holder 6000 according to an embodiment. The structures and functions of the bobbin 1100, the first coil 120, the first magnets 130, the printed circuit board 2500 and the housing 3000 have been previously described.

As shown in FIGS. 13 and 14, the lower end of the lens barrel 4000 may extend downward. Specifically, this is because this configuration is essential to reduce the overall height, that is, the length in the first direction of the movable unit in response to the recent trend toward reduced size and to reduce the overall height, that is, the length in the first direction, of the camera module for the purpose of fabrication of a high-resolution camera module.

In order to manufacture the camera moving apparatus and the camera module including the same, there is a need to provide the blocking member 500 for preventing the lower end of the lens barrel 4000 from colliding with the filter 6000 and breakage of the filter 6000 caused by the collision, along with specific features of the blocking member 500.

As shown in FIG. 14, the lens barrel 4000 mounted on the bobbin may move downward in the first direction, and may also be moved downward by an external impact. When the lens barrel 4000 moves downward, the lower end of the lens barrel 4000 may directly contact the filter 6100.

In this case, although the filter 6100 may be broken or damaged due to impacts applied by the lower end of the lens barrel 4000, the protrusion 5000 provided on the peripheral area of the filter 6100 may prevent direct contact between the lens barrel 4000 and the filter 6100, as shown in FIG. 14.

As described above, since the upper end 5000a of the protrusion 5000 is positioned to be higher than the upper surface 6100a of the filter 6100 in the first direction, the lower end of the lens barrel 4000 collides with the upper end 5000a of the protrusion 5000 upon the downward movement of the lens barrel 4000.

In addition, since the inner surface 5000b of the protrusion 5000 is positioned to face the side surface of the filter 6100 in the state of being spaced apart therefrom, even when the protrusion 5000 collides with the lens barrel 4000 or another component of the lens moving apparatus, the impact applied to the protrusion 5000 is not directly transmitted to the filter 6100.

According to the embodiment, since the protrusion 5000 prevent the lens barrel 4000 or another component of the lens moving apparatus from directly contacting the filter 6100, it is possible to prevent breakage or damage of the filter 6100 due to the impact caused by the direct contact. In other words, by causing the lower end of the lens barrel 4000 to contact the protrusion 5000 rather than the coupled region between the first holder 6000 and the filter 6100, it is possible to prevent breakage or damage of the filter 6100.

That is, the protrusion serves to prevent the lower end of the lens barrel 4000 from breaking or damaging the filter 6100, thereby improving the durability of the filter 6100.

The width of the protrusion 5000 in the second or third direction, perpendicular to the first direction, the distance between the inner side surfaces 5000b of the protrusion in the second or third direction or the like may be appropriately selected in consideration of the moving range of the lens barrel 4000 in the second or third direction during the execution of handshake correction, the position or surface area at which the filter 6100 is mounted, and the like.

As shown in FIG. 15, when the adhesive constituting the first adhesive member 7100 is applied to the first holder 6000, the protrusion 5000 may serve to prevent the adhesive from flowing and thus contaminating or damaging the filter 6100 prior to curing.

Specifically, although the adhesive may flow in the directions of the arrows in FIG. 15 before the adhesive cures, the protrusion 5000, which protrudes in the first direction, may prevent the adhesive from flowing into the filter 6100.

In other words, since the protrusion 5000 prevents the adhesive constituting the first adhesive member 7100, which is applied to the peripheral area of the first holder 6000, from flowing into the first holder 6000 and then flowing into the filter 6100, it is possible to prevent contamination or damage to the filter 6100 caused by the adhesive.

FIG. 16 is a plan view showing the first holder 6000 according to an embodiment. FIG. 17 is a plan view showing the second holder 8000 according to an embodiment. FIG. 18 is a plan view showing the first holder 6000 and the second holder 8000, according to an embodiment, which are coupled to each other.

As shown in FIG. 16, the first holder 6000 may be provided on one side surface thereof with a recess 6200. As shown in FIG. 18, the recess 6200 may be formed in the first holder 6000 at a position corresponding to an opening 7210 (described later) when the first holder 6000 and the second holder 8000 are coupled to each other.

A second adhesive member 7200 for coupling the first holder 6000 to the second holder 8000 may be disposed between the first holder 6000 and the second holder 8000. The second adhesive member 7200 may be formed by the application of an adhesive. Although the second adhesive member 7200 may be formed by applying an adhesive to the lower surface of the first holder 6000 or the upper surface of the second holder 8000, in this embodiment the adhesive is applied to the upper surface of the second holder 8000 to form the second adhesive member 7200.

Like the adhesive constituting the first adhesive member 7100, the adhesive constituting the second adhesive member 7200 may include epoxy, thermosetting adhesive, infrared-curable adhesive and the like.

The second adhesive member 7200 may be provided with the opening 7201 to which adhesive is not applied. As described above, the opening 7210 may be provided at a position corresponding to the recess 6200 in the first holder 6000.

The second holder 8000 may be provided at opposite side areas thereof with a plurality of terminals 8200, and the opening 7210 may be provided in one of the remaining side areas of the second holder 8000. This intends to prevent contamination or damage of the terminals 8200 caused by a filler 9000 when the recess 6200, positioned at a location corresponding to the opening 7201, is filled with the filler 9000.

The width w1 of the opening 7210 may be smaller than the width w2 of the recess 6200. This intends to completely close the space between the first holder 6000 and the second holder 8000, which is opened by the opening 7210, when the recess 6200 is filled with the filler 9000.

In fabrication, an adhesive is applied to the upper surface of the second holder 8000 so as to form the second adhesive member 7200, and the first holder 6000 and the second holder 8000 are coupled to each other. Thereafter, gas may vaporize from volatile material contained in the adhesive while the adhesive is curing.

If the gas remains in the space defined between the lower surface of the first holder 6000 and the upper surface of the second holder 8000, it is preferable to discharge the gas to the outside because the gas would otherwise contaminate or damage circuits, various devices and the like of the first holder 6000 or the second holder 8000.

Accordingly, the gas may be discharged to the outside from the space defined between the lower surface of the first holder 6000 and the upper surface of the second holder 8000 through the opening 7210. After the adhesive constituting the second adhesive member 7200 is cured and the gas is discharged, the recess 6200 in the first holder 6000 is filled with the filler 9000.

Specifically, after the first holder 6000 and the second holder 8000 are coupled to each other by curing of the adhesive constituting the first adhesive member 7100, the recess 6200 of the first holder 6000 may be filled with the filler 9000, thereby closing the space defined between the lower surface of the first holder 6000 and the upper surface of the second holder 8000.

The filler 9000 may be an adhesive. Like the adhesive constituting the first adhesive member 7100 or the second adhesive member 7200, the filler 9000 may include epoxy, thermosetting adhesive, infrared-curable adhesive and the like.

By virtue of this structure, the space defined between the lower surface of the first holder 6000 and the upper surface of the second holder 8000 may be completely closed after the gas is discharged to the outside.

The assembly comprising the first holder 6000 and the second holder 8000 may be subjected to a washing procedure. Since the space defined between the lower surface of the first holder 6000 and the upper surface of the second holder 8000 is closed during the washing procedure, it is possible to provide an effect of enabling wet cleaning using washing liquid.

Specifically, since the space defined between the lower surface of the first holder 6000 and the upper surface of the second holder 8000 is closed by the wet cleaning, it is possible to prevent contamination or damage of the first holder 6000 and the second holder 8000 caused by the fact that the washing liquid infiltrates into the space and remains therein for a long period of time.

In the embodiment, since the assembly of the first holder 6000 and the second holder 8000, which is provided with the recess 6200, the opening 7210 and the filler 9000, does not allow the washing liquid to infiltrate thereinto, the assembly offers the effect of enabling easy execution of wet cleaning.

FIG. 19 is an exploded perspective view showing part of the lens moving apparatus according to a further embodiment. FIG. 20 is a side view showing part of the lens moving apparatus according to the embodiment.

As shown in FIG. 19, the lens moving apparatus according to the embodiment may further include a first holder 1600 and a second holder 1800. The first holder 6000 may be disposed under the base 1210, and may be provided with the filter 1610 mounted thereon.

The filter 1610 may serve to prevent light of a specific frequency range, among light having passed through the lens barrel 1400, from entering the image sensor 1810. Here, the filter 1610 is preferably placed in the x-y plane.

The filter 1610 may be coupled to the upper surface of the first holder 1600, and may be an infrared screening filter in an embodiment. The region of the first holder 1600, on which the filter 1610 is mounted, may be provided with a hole so as to allow light having passed through the filter 1610 to enter the image sensor 1810.

The base 1210 and the first holder 1600 may be coupled to each other by means of an adhesive. Here, the adhesive may include epoxy, thermosetting adhesive, ultraviolet-curable adhesive and the like.

The adhesive may serve to block the infiltration of contaminants into the lens moving apparatus. Accordingly, when the base 1210 and the first holder 1600 are coupled to each other using the adhesive, there is a need to apply the adhesive in order to sufficiently seal the coupled region.

The second holder 1800 may be disposed under the first holder 1600, and may be provided with the image sensor 1810 mounted thereon. Light having passed through the filter 1610 is incident on the image sensor 1810, thereby forming an image, which is contained in the light, on the image sensor 1810.

The image sensor 1810 is preferably placed on the x-y plane. In one embodiment, the image sensor 1810 may be mounted on the upper surface of the first holder 1600.

The second holder 1800 may include various circuits, devices, controllers and the like for converting the image formed on the image sensor 1810 into an electric signal and transmitting the signal to an external device.

The second holder 1800 may be coupled to the first holder 1600. As in the coupling between the base 1210 and the first holder 1600, the second holder 1800 may be securely coupled to the first holder 1600 by bonding using an adhesive material. The second holder 1800 may be constituted by a circuit board, on which the image sensor 1810 is mounted and a circuit pattern is formed and to which various devices are coupled.

As shown in FIG. 20, the filter 1610 and the image sensor 1810 may be positioned to face each other in the first direction. Here, the filter 1610 may be spaced apart from the image sensor 1810 by a predetermined distance in the first direction.

FIG. 21 is a perspective view showing the first holder 1600 according to the further embodiment. As described above, the first holder 1600 may be provided with the filter 1610 mounted thereon, and may be provided with a masking member 1500.

In the embodiment, the masking member 1500 may be provided on the peripheral area of the filter 1610, and may serve to prevent at least some of the light that has passed through the lens barrel 1400 and entered the peripheral area, from passing through the filter 1610.

The reason why the peripheral area of the filter 1610 is shielded by the masking member 1500 will be described in detail later with reference to FIG. 25.

As shown in FIG. 21, the filter 1610 may be configured to have a rectangular shape when viewed in the first direction, and the masking member 1500 may be symmetrically disposed along all of the sides of the filter 1610.

The masking member 1500 may be formed on the side area of the filter 1610 so as to have a constant width. The masking member 1500 may be provided in inner corners thereof with recesses 1510, which extend outward from the inner corner edges. For example, the masking member 1500 has a rectangular inner edge, and the recesses 1510 may be formed from the corners of the inner edge of the masking member 1500 outward. The recesses 1510 may be provided at at least two of the four corners of the filter 1610.

The masking member 1500 may be coupled to, for example, the upper surface 1611 (see FIG. 25) of the filter 1610. The masking member 1500 may be made of an opaque material, and may be provided as a film applied to the filter 1610.

Here, the masking member 1500 may be formed, for example, by attaching additional opaque film to the upper surface 1611 of the filter 1610 using an adhesive. In another embodiment, the masking member 1500 may be formed by applying liquid opaque adhesive material to the upper surface 1611 of the filter 1610 and allowing the adhesive material to cure, but may be formed in various other ways.

FIG. 22 is a plan view showing the second holder 1800 according to the further embodiment. As described above, the second holder 1800 may be provided with the image sensor 1810 mounted thereon, and may be provided with first terminals 1820, second terminals 1830 and wires 1840.

The first terminals 1820 may be formed on the peripheral area of the second holder 1800, and the second holder 1800 may be conductively connected to an external device through the first terminals 1820. Specifically, the first terminals 1820 may be provided on opposite sides of the second holder 1800, as shown in FIG. 22. In another embodiment, the first terminals 1820 may be provided on only one side of the second holder 1800. The first terminals 1820 may include a plurality of terminals.

The second terminals 1830 may be formed near the area on which the image sensor 1810 is mounted, and may be conductively connected to the image sensor 1810 through the wires 1840, which will be described later. As shown in FIG. 22, the second terminals 1830 may include a plurality of terminals disposed around the image sensor 1810.

The wires 1840 may serve to conductively connect the image sensor 1810 to the second terminals 1830. The wires 1840 may be made of a conductive material, such as gold, silver, copper and copper alloy.

The second holder 1800 may be provided with an attachment 1700. The attachment 1700 may serve to couple the first holder 1600 to the second holder 1800. The attachment 1700 may be formed by the application of an adhesive. Although the attachment 1700 may be formed by applying an adhesive to the lower surface of the first holder 1600 or the upper surface of the second holder 1800, the adhesive is applied to the upper surface of the second holder 1800 to form the attachment 1700 in this embodiment.

The adhesive constituting the attachment 1700 may include epoxy, thermosetting adhesive, infrared-curable adhesive and the like.

FIG. 23 is a plan view showing the masking member 1500, which overlaps the second holder 1800 shown in FIG. 22. FIG. 24 is an enlarged view showing region B of FIG. 23. Although the masking member 1500 may be coupled to the upper surface 1611 of the filter 1610 in an embodiment, FIGS. 23 and 14 are provided in order to explain the structure in which the masking member 1500 overlaps the second holder 1800.

Since the filter 1610 is positioned to face the image sensor 1810 in the first direction, the masking member 1500, which is coupled to the peripheral area of the filter 1610, may overlap the second holder 1800, and may thus overlap at least some of the second terminals 1830 and the wires 1840 when viewed in the first direction, as shown in FIGS. 23 and 24.

The image sensor 1810 may be configured to have a rectangular shape when viewed in the first direction, and the recesses 1510 may be formed so as not to interfere with the corners of the image sensor 1810 when viewed in the first direction.

The recesses 1510 having this configuration may serve to allow, during the assembly of the lens moving apparatus, easy implementation of an active alignment process, by which the movable unit including the lens barrel 1400 is aligned in the x-y plane such that light having passed through the lens barrel 1400 enters the image sensor 1810 at a position that is determined by design.

Specifically, an active alignment apparatus used in the active alignment process may be implemented in such a way as to recognize four corners 1811 of the image sensor 1810, to determine the location of the image sensor 1810 in the x-y plane, and to move the movable unit into the x-y plane in accordance with the determination.

In other words, the active alignment apparatus may recognize the locations of four corners 1811 of the image sensor 1810 in the x-y plane using a detection unit provided in the apparatus at a position over the filter 1610 and the masking member 1500, and may then perform the remaining procedures of the active alignment process in accordance with the recognized locations.

In order to implement the active alignment process, the recesses 1510 may be formed so as not to interfere with the corners 1811 of the sensor 1810 when viewed in the first direction, and the active alignment apparatus may thus recognize four corners 1811 of the image sensor 1810, thereby determining the exact location of the image sensor 1810 in the x-y plane.

The recesses 1510 may be configured to have any shape, as long as the recesses 1510 do not interfere with the corners 1811 of the sensor 1810. For example, each of the recesses 1510 may be configured to have an arcuate shape, a curved shape, a polygonal shape or the like.

FIG. 25 is a cross-sectional view showing part of the lens moving apparatus according to an embodiment. As shown in FIG. 25, the masking member 1500, which is coupled to the peripheral area of the upper surface of the filter 1610, may serve to prevent undesired light, among the lights that has passed through the lens barrel 1400 from entering the image sensor 1810.

In particular, the light that enters the second terminals 1830 and the wires 1840, may be reflected by the second terminals 1830 and the wires 1840, which are made of a conductive material, thereby generating instantaneous flaring. This flaring may distort an image formed on the image sensor 1810, or may deteriorate the quality of the image.

Accordingly, the masking member 1500 may shield the second terminals 1830 and the wires 1840 so as not to allow the incident light L to enter the second terminals 1830 and the wires 1840, thereby preventing a flaring phenomenon. As a result, it is possible to prevent an image formed on the image sensor 1810 from being distorted or from having a deteriorated image quality.

In addition, since the recesses 1510 formed in the masking member 1500 enables the active alignment apparatus to determine the exact location of the image sensor 1810 in the x-y plane by recognizing the corners 1811 of the image sensor 1810, it is possible to easily implement the active alignment process of the lens moving apparatus.

The lens moving apparatus according to this embodiment may be incorporated in devices in various fields, for example, a camera module. Such a camera module may be applied to mobile devices such as cellular phones.

The actuator module for fulfilling the autofocusing function may be constructed in various fashions, but mainly adopts a voice coil unit motor. The lens moving apparatus according to this embodiment may serve as an actuator module for fulfilling both autofocusing and optical image stabilizing functions.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
 a lens barrel configured to vertically move;
 a filter disposed below the lens barrel;
 a holder coupled with the filter;
 an image sensor disposed below the filter; and
 a masking member disposed on the filter and comprising an opening disposed on a position corresponding to the image sensor,
 wherein the image sensor comprises an image sensing region having a rectangular shape,
 wherein the opening of the masking member comprises a recess horizontally recessed outwardly from a portion corresponding to a corner of the image sensing region of the image sensor, and
 wherein the recess of the opening of the masking member is not vertically overlapped with the corner of the image sensing region of the image sensor.

2. The camera module according to claim 1, wherein the opening of the masking member comprises a shape corresponding to the image sensing region of the image sensor and the recess of the opening of the masking member is recessed outwardly from a corner region of the opening of the masking member corresponding to the corner of the image sensing region of the image sensor.

3. The camera module according to claim 1, wherein the opening of the masking member has a rectangular inner edge, and the recess of the opening of the masking member is formed from a corner of the inner edge of the masking member.

4. The camera module according to claim 1, wherein the opening of the masking member is disposed on a position corresponding to the image sensing region of the image sensor.

5. The camera module according to claim 1, wherein the opening of the masking member comprises four recesses, and the four recesses are disposed on positions corresponding to four corners of the image sensing region of the image sensor, respectively.

6. The camera module according to claim 1, wherein the opening of the masking member comprises at least two recesses,
 wherein the filter has a rectangular shape, and
 wherein the two recesses are disposed on positions corresponding to two corners of four corners of the filter, respectively.

7. The camera module according to claim 1, wherein the recess comprises any one of an arcuate shape, a curved shape, and a polygonal shape.

8. The camera module according to claim 1, further comprising a circuit board coupled with the image sensor, and
 wherein the circuit board comprises—terminals connected to the image sensor by wires.

9. The camera module according to claim 1, wherein the recess of the opening of the masking member is configured so as not to interfere with four corners of the image sensing region of the image sensor when viewed vertically.

10. The camera module according to claim 1, wherein the masking member is coupled to an upper surface of the filter, and comprises an opaque material.

11. The camera module according to claim 1, wherein the filter comprises a rectangular shape, and the masking member is symmetrically disposed along four sides of the filter.

12. The camera module according to claim 1, wherein the filter comprises an infrared cutoff filter, and
 wherein an area of the masking member is smaller than an area of the filter when viewed vertically.

13. The camera module according to claim 1, wherein the opening of the masking member comprises four recesses and the four recesses are not vertically overlapped with four corners of the image sensing region of the image sensor, respectively.

14. The camera module according to claim 4, wherein an area of the opening of the masking member is greater than an area of the image sensing region of the image sensor.

15. The camera module according to claim 8, wherein the masking member is vertically overlapped with at least a portion of any one of the terminals and the wires.

16. A phone comprising the camera module according to claim 9.

17. The camera module according to claim 10, wherein the masking member comprises any one of a film and a liquid adhesive material.

18. A camera module comprising:
 a lens barrel configured to vertically move;
 a filter disposed below the lens barrel;
 a holder coupled with the filter; and
 an image sensor disposed below the filter,
 wherein the image sensor comprises an image sensing region having a rectangular shape,
 wherein the filter comprises a masking member comprising an opening disposed on a position corresponding to the image sensing region of the image sensor,
 wherein the opening of the masking member comprises a recess disposed on a position corresponding to a corner of the image sensing region of the image sensor, and
 wherein an area of the opening of the masking member is greater than an area of the image sensing region of the image sensor.

19. The camera module according to claim 18, further comprising a circuit board coupled with the image sensor,
 wherein the circuit board comprises terminals connected to the image sensor by wires,
 wherein the masking member is vertically overlapped with at least a portion of any one of the terminals and the wires, and
 wherein the recess of the opening of the masking member is not vertically overlapped with the corner of the image sensing region of the image sensor.

20. The camera module according to claim 19, wherein the opening of the masking member comprises a shape corresponding to the image sensing region of the image sensor and the recess of the opening of the masking member is horizontally recessed outwardly from a corner region of the opening of the masking member corresponding to the corner of the image sensing region of the image sensor.

* * * * *